United States Patent [19]

Kurata

[11] Patent Number: 5,361,181
[45] Date of Patent: Nov. 1, 1994

[54] DISK HOLDING DEVICE WITH ATTACHED PHASE DETECTING DEVICE AND ADJUSTING MECHANISM

[75] Inventor: Tetsuji Kurata, Kanagawa, Japan

[73] Assignee: Canon Kabushiki Kaisha, Tokyo, Japan

[21] Appl. No.: 39,512

[22] Filed: Mar. 29, 1993

Related U.S. Application Data

[63] Continuation of Ser. No. 795,230, Nov. 15, 1991, abandoned, which is a continuation of Ser. No. 371,535, Jun. 23, 1989, abandoned.

[30] Foreign Application Priority Data

Jun. 29, 1988 [JP] Japan .................. 63-161539

[51] Int. Cl.⁵ .................................. G11B 5/06
[52] U.S. Cl. .................................. 360/99.02
[58] Field of Search ............ 360/133, 99.06, 99.02, 360/99.12, 106, 86, 96.6, 99.01

[56] References Cited

U.S. PATENT DOCUMENTS

| | | | |
|---|---|---|---|
| 4,466,032 | 8/1984 | Saito | 360/97.01 |
| 4,656,542 | 4/1987 | Shibata | 362/99.06 |
| 4,686,594 | 8/1987 | Kurafuji | 360/99.02 |
| 4,694,364 | 9/1987 | Matsuda et al. | 360/99.02 |
| 4,717,976 | 1/1988 | Nishimura et al. | 360/99.02 |
| 4,763,214 | 8/1988 | Shibaike | 360/99.06 |
| 4,812,931 | 3/1989 | Shibaike | 260/99.06 |
| 4,860,136 | 8/1989 | Sasaki et al. | 360/99.02 |
| 4,890,175 | 12/1989 | Tezuka | 360/99.06 |

FOREIGN PATENT DOCUMENTS

| | | | |
|---|---|---|---|
| 59-33666 | 2/1984 | Japan | 360/99.02 |
| 60-214485 | 10/1985 | Japan | 360/99.06 |
| 61-206965 | 9/1986 | Japan | 360/99.06 |

*Primary Examiner*—A. J. Heinz
*Attorney, Agent, or Firm*—Robin, Blecker, Daley & Driscoll

[57] ABSTRACT

A recording or reproducing apparatus includes a holder which is arranged to move a recording medium containing jacket from a position where the jacket is removable to a predetermined loading position, a stabilizing member which stabilizes a recording medium contacting state of a head when the stabilizing member is in an operating position where the member is opposed to the head across the recording medium, a positioning member which positions the jacket by engaging the engaging part of the jacket in the loading position, and a support member which is arranged to set the stabilizing member in the operating position by engaging the positioning member.

17 Claims, 13 Drawing Sheets

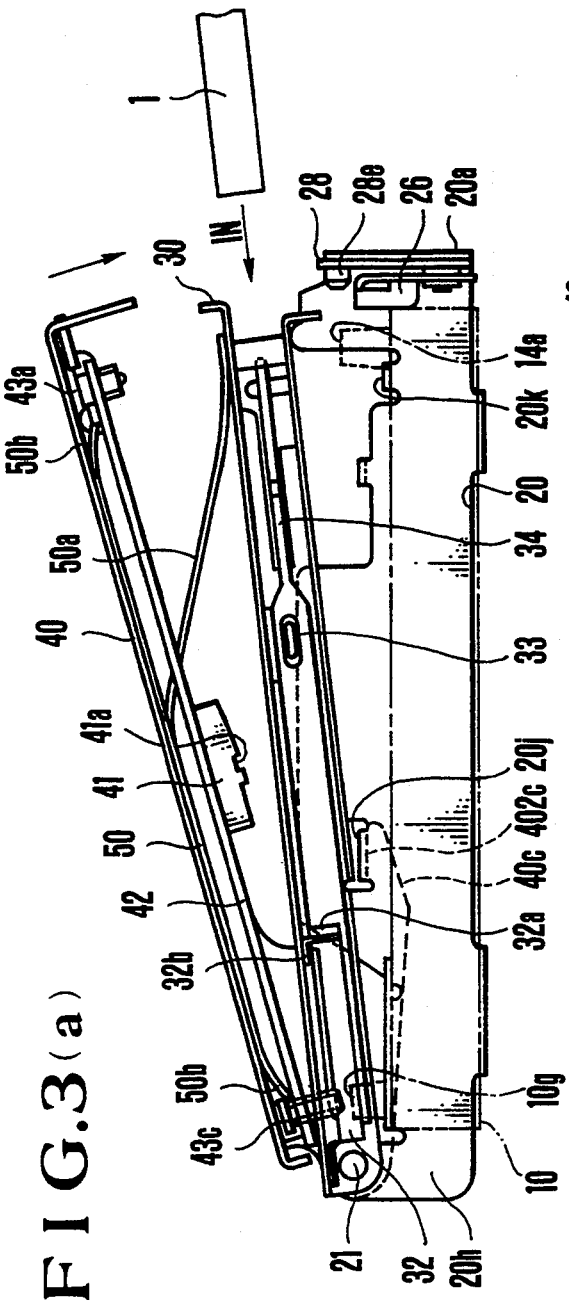
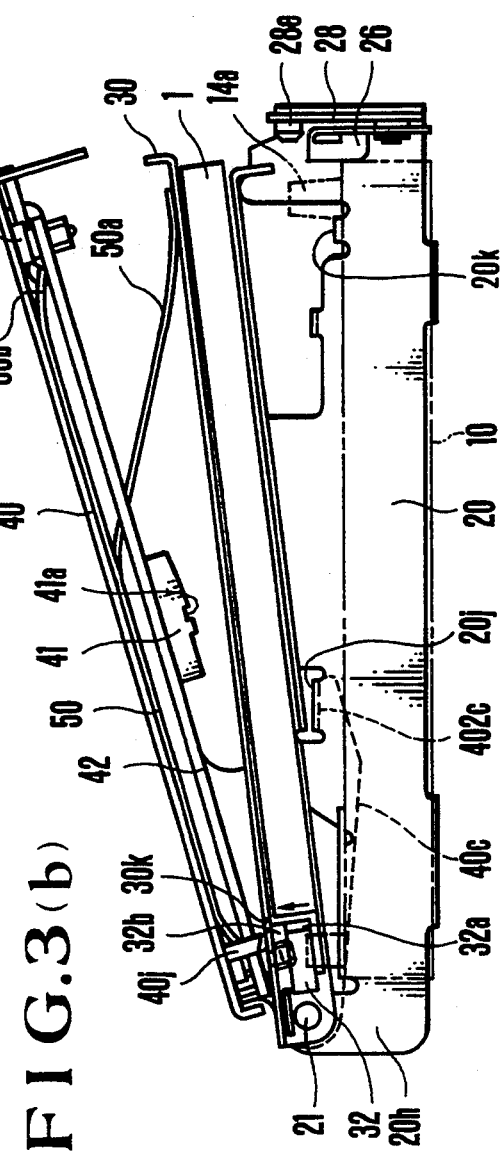

DISK HOLDING DEVICE WITH ATTACHED PHASE DETECTING DEVICE AND ADJUSTING MECHANISM

This is a continuation application under 37 CFR 1.62 of prior application Ser. No. 795,230, filed Nov. 15, 1991, now abandoned which is a continuation application under 37 CFR 1.62 of prior application Ser. No. 371,535, filed Jun. 23, 1989 now abandoned.

BACKGROUND OF THE INVENTION

1. Field of the Invention

This invention relates to a recording or reproducing apparatus.

2. Description of the Related Art

Recording or reproducing apparatuses of the kind using a rotary magnetic disc for recording or reproducing video, audio and data signals have been known.

The apparatus of this kind uses a stabilizing plate which is opposed to a recording or reproducing magnetic head across a rotating magnetic disc for the purpose of stably and adequately keeping a contact state (head touch) between the magnetic head and the magnetic disc.

This stabilizing plate is well known requiring no detailed description. Briefly stated, the plate is arranged to control the atmospheric pressure and an air flow taking place near the head in such a way as to prevent the magnetic disc from buoying up or vibrating relative to the magnetic head. Apparatuses of the kind using the stabilizing plates have been disclosed, for example, in U.S. patent applications Ser. No. 648,701 (filed on Sep. 7, 1984), No. 648,700 (filed on Sep. 7, 1984), No. 707,871 (filed on Mar. 4, 1985), No. 777,235 (filed on Sep. 18, 1985), No. 777,282 (Filed on Sep. 18, 1985), No. 778,390 (filed on Sep. 20, 1985) and No. 838,901 (filed on Mar. 12, 1986); and U.S. Pat. Nos. 4,716,477, 4,736,357, 4,734,809, etc.

The stabilizing plate is required to control the subtle magnetic head contacting state of the magnetic disc. The operating position of the stabilizing plate, therefore, must be highly accurately determined. To meet this requirement, the stabilizing plate is provided with some positioning means for setting it in its operating position. The magnetic disc contacting position of the stabilizing plate is determined by the positioning means.

Meanwhile, a high degree of precision is also required for determining the loading position of the magnetic disc. Generally, the apparatus is provided with a positioning post for this purpose. A positioning hole provided in a magnetic disc housing jacket is fitted on this positioning post.

In accordance with the above-stated arrangement of the conventional apparatus, however, the positioning means for setting the stabilizing plate in its operating position and another positioning means for setting the magnetic disc in its loading position are arranged separately from each other. This makes the internal arrangement of the apparatus complex. Further, since the magnetic disc and the stabilizing plate are arranged to be indirectly positioned through the chassis or the like of the apparatus, their positions tend to deviate causing errors. Therefore, it has been difficult to secure an adequate degree of positioning precision.

SUMMARY OF THE INVENTION

This invention is aimed at the solution of the above-stated problems of the prior art. It is therefore a first object of the invention to accurately set a recording medium stabilizing member in the operating position thereof.

It is a second object of the invention to provide a recording or reproducing apparatus which is not only capable of accurately placing a recording medium stabilizing member in its operating position but is also capable of positioning the recording medium with a high degree of precision relative to the stabilizing member.

It is a third object of the invention to provide a recording or reproducing apparatus which is capable of accurately positioning a recording medium stabilizing member and the recording medium with a simple arrangement.

Under this object, a recording or reproducing apparatus arranged according to the invention as a preferred embodiment thereof comprises moving means for moving a jacket which houses a recording medium from a removable position of the jacket to a given loading position thereof; a stabilizing member which is opposed to a head in an operating position thereof across the recording medium and is arranged to stabilize a recording medium touching state of the head; positioning means for positioning the jacket by engaging an engaging part of the jacket in the loading position; and a positioning support member which is arranged to position the stabilizing member in the operating position by engaging the positioning means. The arrangement enables the apparatus to minimize any discrepancy in position between the jacket and the stabilizing member for the optimum head touch of the recording medium by directly positioning the jacket and the stabilizing member.

Another recording medium loading device arranged according to this invention as a preferred embodiment thereof comprises first positioning means for positioning a recording medium in a loading position thereof; head means for recording or reproducing on or from the recording medium; a stabilizing member for stabilizing a recording medium contacting state of the head means; and second positioning means for positioning the stabilizing member relative to the first positioning means.

It is a fourth object of the invention to provide a recording or reproducing apparatus which is arranged to ensure an adequate head touch by removing any positional deviation of a stabilizing plate and a recording medium without requiring much space.

These and other objects and features of the invention will become apparent from the following detailed description of embodiment thereof taken in connection with the accompanying drawings.

BRIEF DESCRIPTION OF THE DRAWINGS

FIGS. 3(a) to 3(d) are side views showing the arrangement of ejecting means, a holder and a cover body and their operations.

DETAILED DESCRIPTION OF THE PREFERRED EMBODIMENT

Figure 11:
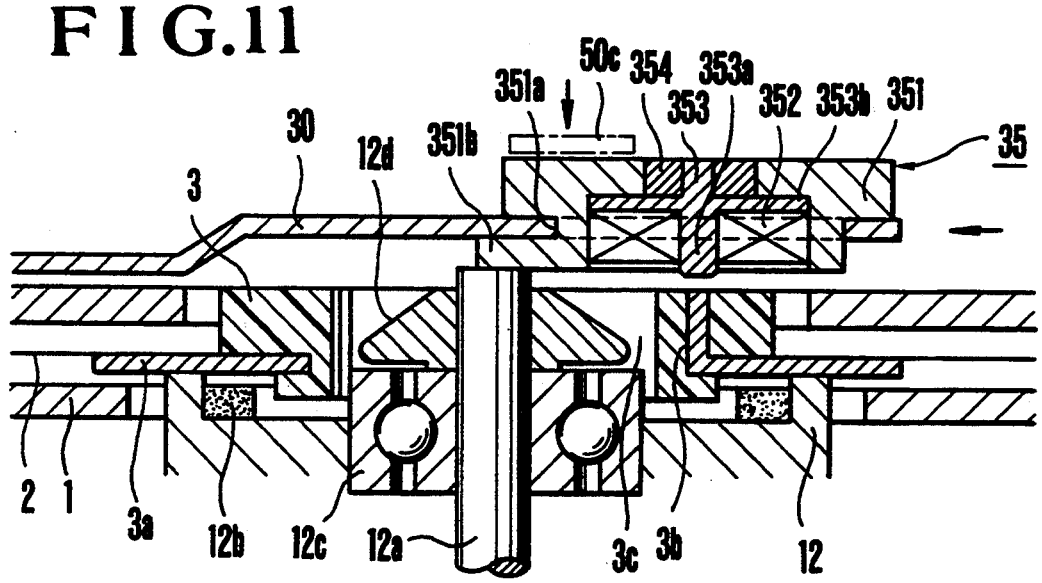
FIGS. 11 and 12 show in a sectional view and an oblique view the arrangement of a PG detection member.
Figure 13:
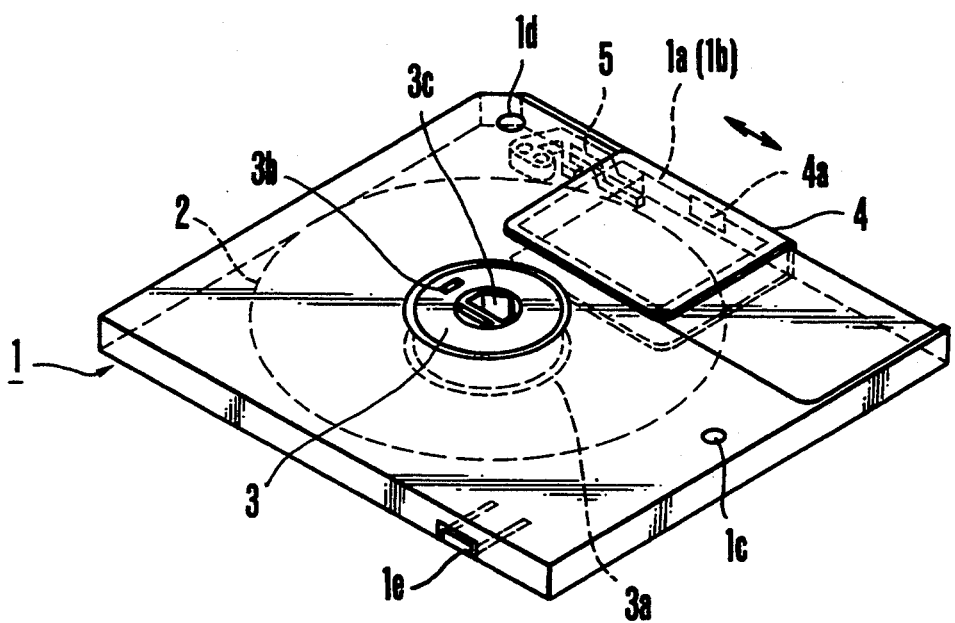
FIG. 13 is an oblique view showing a magnetic disc and the jacket thereof to be used by the same embodiment.

A recording or reproducing apparatus embodying this invention is arranged as described below with reference to the accompanying drawings:

FIG. 13 is an oblique view showing by way of example a jacket 1 containing therein a recording medium to be used by the invented apparatus. Referring to FIG. 13, a magnetic disc 2 which is the recording medium is rotatably disposed within the jacket 1. A center core 3 which is formed with a synthetic resin or the like is attached to the central part of the disc 2. The center core 3 is provided with an engaging hole 3c for engagement with a disc rotating spindle and is exposed by center holes provided in the upper and lower sides of the jacket 1. A magnetic plate 3a is disposed on the lower side of the center core 3 and is arranged to be magnetically attached by a magnet disposed on the spindle. The magnetic plate 3a is formed in one unified body with a projection which is bent upward to be exposed on the upper surface of the center core 3 piercing through the inside of the core 3 as shown in FIG. 11. The projection is arranged such that, when the center core 3 is mounted on the spindle, the magnetic flux of the magnet of the spindle is induced to the upper surface of the center core 3. The projection thus serves as a rotating phase indicating member 3b showing the rotation phase of the disc 2 (hereinafter this member will be referred to as PG pin).

The jacket 1 is provided with disc exposing apertures 1a and 1b which are formed in the upper and lower sides of the jacket 1 in positions confronting each other. The lower aperture 1b permits a recording or reproducing magnetic head to be inserted therein. The upper aperture 1a permits insertion therein of a stabilizing plate which is arranged to stabilize the contacting state of the magnetic disc 2 and the magnetic head as will be described later. A shutter 4 is arranged to be slidable in the directions of arrows to open and close these apertures 1a and 1b. The shutter 4 is provided with an engaging hole 4a which is arranged to engage a shutter closing mechanism which will be described later herein.

A lock member 5 is arranged to lock the shutter 4 in a closed position. Although the details of it are omitted from description, a part of the lock member 5 is exposed on one side face of the jacket 1. When the jacket 1 is inserted, the lock member 5 is operated by a release member which is disposed on the side of a jacket holder and is arranged to release the lock member 5 from its locked state. Positioning holes 1c and 1d are provided near the side edges of the jacket 1. When the jacket 1 is loaded on a jacket loading parts, the loading position of the jacket 1 is determined by the positioning holes. An operation piece 1e is provided on the lower side of the jacket 1 for preventing an erroneous recording action on the recording disc 2.

Next, the arrangement of the embodiment of the invention is described with reference to drawings in order. The arrangement of the whole embodiment will be first described and before detailed description of each of the component mechanisms.

Figure 1:
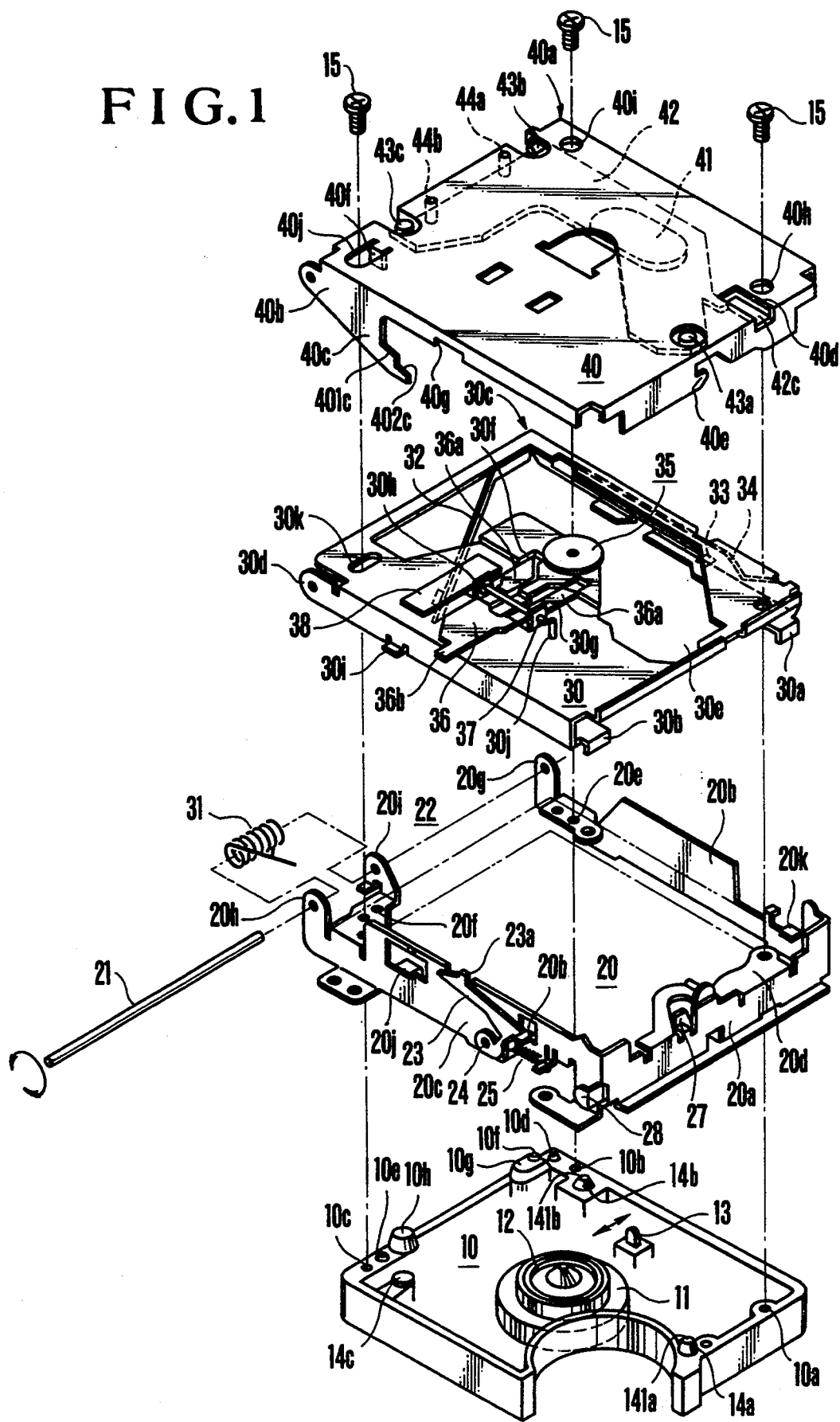
FIG. 1 is an exploded view showing the arrangement of an embodiment of this invention in a case where the invention is applied to a recording or reproducing apparatus.

FIG. 1 is an exploded view showing the basic arrangement of the jacket loading mechanism of the apparatus embodying this invention. The body of the recording or reproducing apparatus includes a chassis 10 which is molded by die casting or the like with a high degree of precision. The chassis 10 is provided with positioning posts 14a, 14b, 14c, etc. for accurately positioning the disc rotating spindle 12; a spindle motor 11 which is arranged to drive and rotate the spindle 12; the magnetic head 13 which is arranged to perform recording or reproduction by coming into contact with the magnetic disc 2 through the lower aperture 1b of the jacket 1 loaded on the apparatus; a head shifting mechanism (not shown); and the jacket 1. These posts thus form a jacket loading part in conjunction with the chassis 10. When the jacket L is loaded on the apparatus, the positioning posts receive the lower side of the jacket 1 and determine its position in the direction of height. Further, the positioning posts 14a and 14b are provided with projections 141a and 141b which are arranged to be inserted into the positioning holes 1c and 1d of the jacket 1 for determining the position of the jacket 1 in the horizontal direction. The positioning post 14a is further arranged to be used also for positioning the stabilizing plate which will be described later.

Projections 10d and 10e are arranged at given points of the peripheral edge of the upper side of the chassis 10 to be used for positioning a frame 20 which is arranged to carry the jacket loading mechanism. The chassis 10 is provided also with screw holes 10a, 10b and 10c for screwing the frame 20 to its mounting position; and also with projections 10f, 10g and 10h which abut on a support plate 42 to define the height of the support plate 42 which is arranged to support the stabilizing plate 41.

A support plate 41 for the stabilizing plate 42 is arranged to have the stabilizing plate 42 in an operating position where it is in contact with the magnetic disc 2 through the aperture part 1a of the jacket 1 The height of the operating position is determined by the above-stated projections 10g and 10h and the horizontal location of the operating position is determined by the positioning post 14a and the projection 10f. The further details of this will be described later.

A reference numeral 20 denotes a frame which is provided for assembling a jacket loading mechanism consisting of a holder 30 and a cover body 40. The frame 20 consists of a front plate 20a, a right side plate 20b and a left side plate 20c which are formed by bending a metal plate of a relatively low rigidity into a C-shape. Bent pieces 20e and 20f which are formed at the ends of the right and left side plates 20b and 20c. The frame 20 is positioned by securing these bent pieces 20e and 20f to the projections 10d and 10e of the chassis 10 with screws 15 using screw holes 10b and 10c provided in the chassis 10. Further, another bent piece 20d which is formed on the inner side of the front plate 20a is also secured to the chassis 10 by means of a screw 15 and a screw hole 10a. The frame 20 is thus secured to the upper side of the chassis 10 at three points including two points located in the neighborhood of a hinge.

In other words, with the chassis 10 formed with a high degree of precision by die casting or the like, the frame 20 is accurately positioned by the above-stated three-point mounting arrangement. The metal material used for forming the frame 20 is not required to have a high degrees of rigidity, precision and strength. On the contrary, use of a thin and soft metal plate of a low rigidity enables the frame 20 to be easily formed and positioned in mounting. Besides, in the event of occurrence of any stress due to screwing, etc., the stress can be absorbed by the frame 20. Therefore, the frame 20 can be mounted on the chassis 10 without any mounting distortion, any deterioration in precision and any deformation due to an unnecessary external force.

The frame 20 is provided with a hinge part 22 for rotatably carrying the jacket holder 30 and the cover body 40 which will be described later. To form this hinge part 22, protruding pieces 20g, 20h and 20i are formed at the ends of the two side plates 20b and 20c and at the tip of the bent piece 20f respectively and a fulcrum shaft 21 is inserted through holes provided in these protruding pieces 20g, 20h and 20i. Further, the free ends of the frame 20 are thus connected by this shaft 21. Therefore, even though the frame 20 is formed by a weak metal plate having a low rigidity, the frame 20 has sufficient degrees of strength and precision at the hinge part 22 for carrying the jacket loading mechanism. Unlike the conventional arrangement of having side plates either separately disposed or connected through an upper plate, the C-shaped frame 20 mounted on the chassis 10 in the three-point mounting manner obviates the necessity of having any upper plate to permit reduction in the number of manufacturing processes and in the thickness of the arrangement. Further, since the three sides of the frame can be simultaneously formed and mounted, the positions of the different faces of the frame relative to each other can be easily determined.

A control lever 23 is provided for controlling a disc pushing member 36 which is arranged to push the center core 3 of the disc 2. The control lever 23 is pivotally mounted on the left side plate 20c of the frame 20 by means of a shaft 24. A spring 25 is arranged to constantly urge the lever 23 to turn round clockwise. The turning motion of the lever 23 is restricted by a projection 20l. Further, on the inner side of the front plate 20a, there are provided a lock stop lever 27 and a lock lever 28 which are arranged to lock the cover body 40 and the jacket holder 30 in their closed positions.

A projection 20j is arranged to engage the engaging arm 40c of the cover body 40 for determining thereby the open position of the cover body 40 and that of the jacket holder 30. A projection 20k is arranged to determine the closed position of the holder 30.

The jacket holder 30 is arranged to hold the jacket 1 and to move it to a jacket loading position on the chassis 10 of the apparatus body when the jacket 1 is inserted from the outside. The holder 30 is provided with guiding and holding parts 30a and 30b which are arranged on two lower sides of the holder 30 to hold and guide the two side parts of the jacket 1 when the jacket 1 is inserted in the direction of arrow IN shown in FIG. 2.

The holder 30 has protruding pieces 30c and 30d formed for the hinge at the rear end thereof. The protruding pieces 30c and 30d are rotatably mounted on the shaft 21 of the hinge part 22 of the frame 20. A coil spring 31 urges the holder 30 to normally open, i.e., in the counterclockwise direction as viewed on FIGS. 1 and (a). Further, the resilient force of the spring 31 in the direction of the fulcrum shaft 21 constantly presses the hinge part 30d of the holder 30 against the protruding piece 20h which is provided on one side of the frame 20. This prevents the holder 30 from rattling for a higher precision of the loading position of the jacket 1.

On the upper side of the holder 30, there are provided aperture parts 30e and 30f for allowing various operation members including the disc pushing member 36 and the stabilizing plate 41 to pass there.

In the rear part of the holder 30, a resilient member (leaf spring) 32 is arranged to serve as a jacket ejecting member. On the right side of the holder 30 are provided a shutter opening member 33 which opens the shutter 4 by engaging the shutter 4 when the jacket 1 is inserted into the holder 30 and a shutter closing member 34 which is formed with a resilient member (leaf spring) and closes the shutter 4 when an ejecting action is performed on the jacket 1. An engaging hole 30k is formed in the rear upper side part of the holder 30 and arranged to lock the jacket ejecting member 32 to its rear pushing position.

A phase detection member (PG coil) 35 which is arranged to detect the rotation phase of the disc 2 by detecting the PG pin 3b of the center core 3 is disposed in the middle part of the upper side of the holder 30 and is arranged to be close to and opposed to the center core 3 when the magnetic disc 2 is mounted on the spindle 12 and rotated. At the aperture part 30f located adjacent to the PG coil 35, there is disposed a disc pushing member 36 which is arranged to push the upper surface of the center core 3 of the disc 2 to fit it onto the spindle 12 when the disc 2 is loaded on the jacket loading part of the apparatus body chassis 10. A shaft 37 which has its middle part carried by protruding pieces 30g and 30h rotatably carries the disc pushing member 36. The disc pushing member 36 is provided with a pushing part 36a which is arranged at one end part thereof on the side of the spindle 12 to push the center core 3 without touching the PG coil 35 and the spindle 12. At the other end of the disc pushing member 36, there is formed an engaging piece 36b which is arranged to engage the above-stated control lever 23 which is provided on one side of the frame 20. Further, the holder 30 includes a projection 30i which is arranged to restrict a rotating position of the holder 30 relative to the cover body 40. Another projection 30j is erected on the holder 30 and is opposed to one end of the shaft 37 of the disc pushing lever 36 for the purpose of preventing the shaft 37 from pulling out as apparent from FIG. 2. A relay board 38 is used for relaying a lead wire (not shown) in making wiring required for supplying the output of the PG coil 35 to a servo circuit substrate disposed on the side of the apparatus body. The board 38 is disposed on holder 30 at a part on the other side of the shaft 37. The other end of the shaft 37 is prevented from pulling out by the thickness of the lead wire relay board 38.

The above-stated arrangement obviates the necessity of the use of E rings or caulking work at the ends of the shaft 37 for preventing it from pulling out. This thus permits simplification of the structural arrangement.

The cover body 40 is arranged on the outside of the jacket holder 30 to be freely opened and closed along with the holder 30. The cover body 40 includes a hinge part. The hinge part is formed jointly by support pieces 40a and 40b and the shaft 21 of the hinge part 22. The cover body 40 is thus rotatably mounted on the shaft 21 through the support pieces 40a and 40b. A leaf spring 50a which is attached to the back side of the cover body 40 constantly urges the cover body 40 to turn counterclockwise. An engaging arm 40c is provided on the left side of the cover body 40. The relative turnable range of the cover body 40 is restricted with an upper engaging part 401c of the engaging arm 40c positioned below the projection 30i which is provided on the back side of the holder 30. Further, the opening positions of the cover body 40 and the holder 30 relative to the frame 20 are restricted by having the lower engaging part 402c of the engaging arm 40c positioned below the projection 20j provided on the side of the frame 20.

The inner part of the cover body 40 is arranged as follows: the stabilizing plate 41 which comes to abut on the magnetic disc 20 via the upper aperture part 30e of the holder 30 when the cover body 40 is closed is carried via a support plate 42. The support plate 42 is mounted to be shiftable up and down relative to the cover body 40 by pins 44a and 44b provided on the reverse side of the cover body 40 and an engaging projection 42c inserted into a hole 40d provided in the front side of the cover body 40. A leaf spring 50b which will be described later constantly urges the support plate 42 to move downward, i.e., toward the chassis 10 of the apparatus body.

The support plate 42 is provided with adjustable positioning pins 43a to 43c which are arranged to abut on the positioning post 14a and the positioning projections 10g and 10h which are disposed on the chassis 10 in such a way as to determine the positions of the support plate 42 in the vertical and horizontal directions. The further details of the arrangement for carrying the stabilizing plate 41 will be described later.

A lock claw 40e is arranged on the front side of the cover body 40 to lock the cover body 40 and the holder 30 in their closed positions by engaging the lock lever 28 which is disposed in front of the frame 20. A disengaging projection 40f is formed on the inner side of the upper plate of the cover body 40 in the vicinity of the hinge part 22 and is opposed to the engaging hole 30k of the holder 30. The disengaging projection 40f is thus arranged to disengage the jacket ejecting member 32 from the engaging hole 30k of the holder 30.

Further, the cover body 40 has an engaging part 40g arranged to engage the control lever 23 in such a way as to cancel the pushing action of the disc pushing member when the cover body 40 closes; and holes 40h, 40i and 40j which are arranged to permit a screw driver (not shown) to be inserted therethrough for removal of and a screwing action on fixing screws 15 used for securing the frame 20 to the chassis 10 after the cover body 40 has been assembled. These holes enable the cover body 40, the jacket holder 30 and the frame 20 to be taken out as a jacket loading mechanism unit, for example, for repair work or in replacing the head with a new head without separating them from each other. This is a great advantage in terms of repair serviceability and workability.

With the embodiment arranged as described above, the jacket 1 is inserted in the direction of arrow IN against the jacket ejecting member 32 into the holder 30 which is in an open state. After the jacket 1 is placed within the holder 30, the cover body 40 is closed by moving it toward the chassis 10 of the apparatus body. The holder 30 is thus placed in the jacket loading position on the chassis 10. Then, the jacket 1 is completely loaded with the cover body 40 locked to a closed position by further closing the cover body 40.

In taking out the jacket 1, the cover body 40 is unlocked. This allows the spring 31 to open the cover body 40. The jacket ejecting member 32 then ejects the jacket 1 toward the outside of the holder 30.

The main points of the structural arrangement of this embodiment of the invention are as described above. Next, the details of it are as described below:

(i) The opening and closing actions of the cover body 40 and the holder 30 and the operations of jacket-ejecting and shutter-opening-and-closing mechanisms:

The jacket loading actions of the cover body 40 and the holder 30 and the jacket-ejecting mechanism which ejects the jacket 1 toward the outside of the holder 30 and the shutter opening-and-closing mechanism are first described with reference to FIGS. 2, 3(a) to 3(d) and 4.

Figure 2:
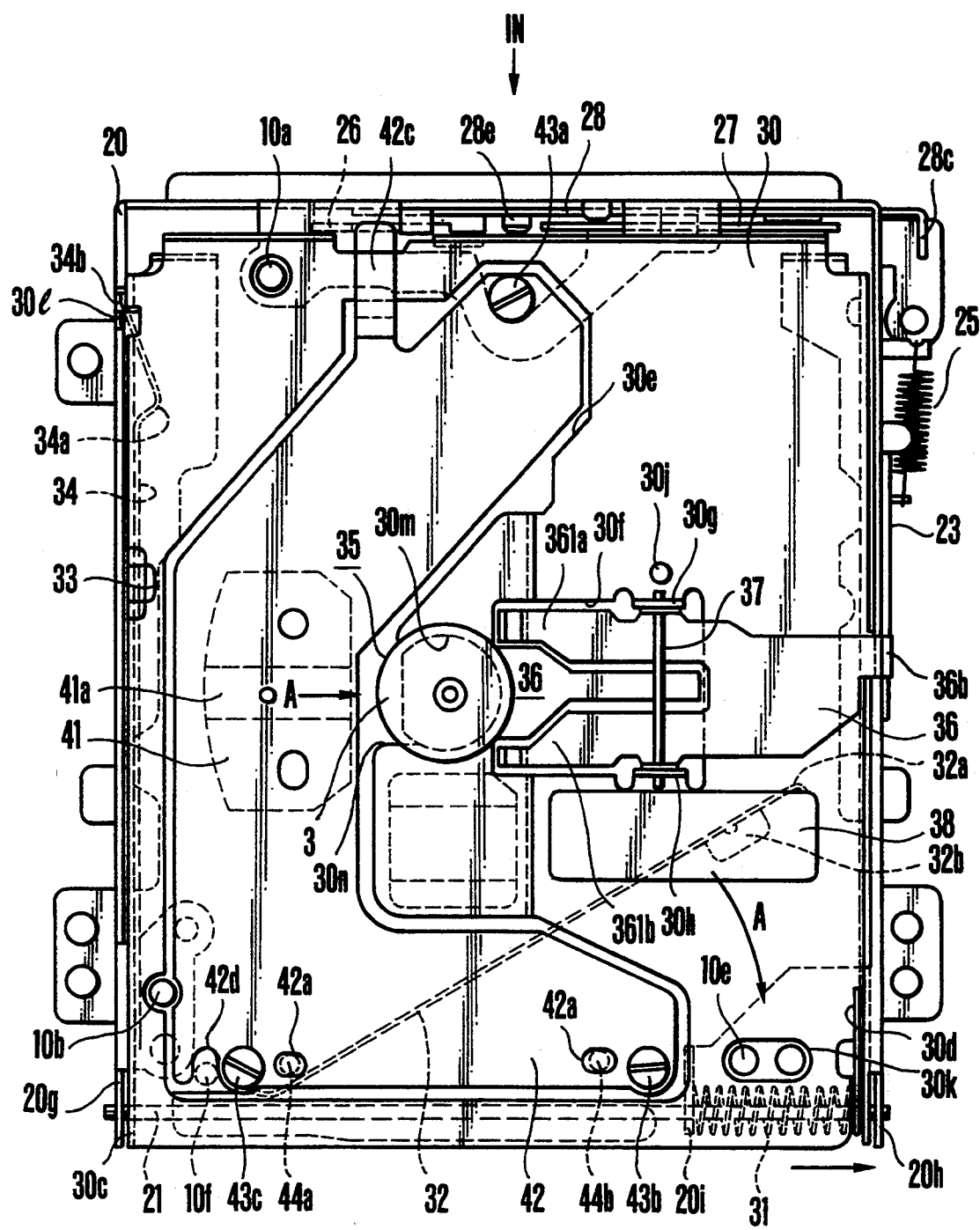
FIG. 2 is a top view showing the same embodiment.
Figure 3C:
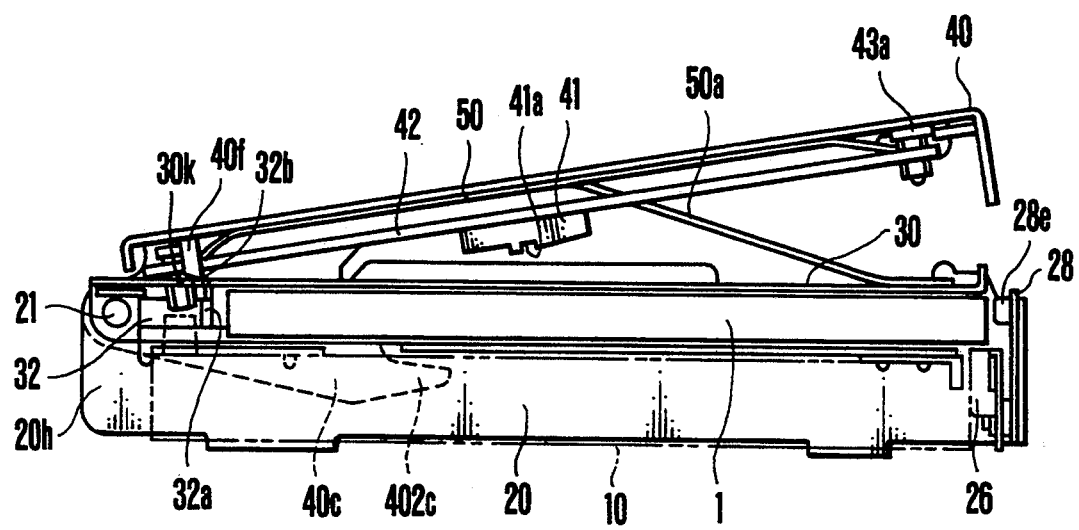
Figure 7A:
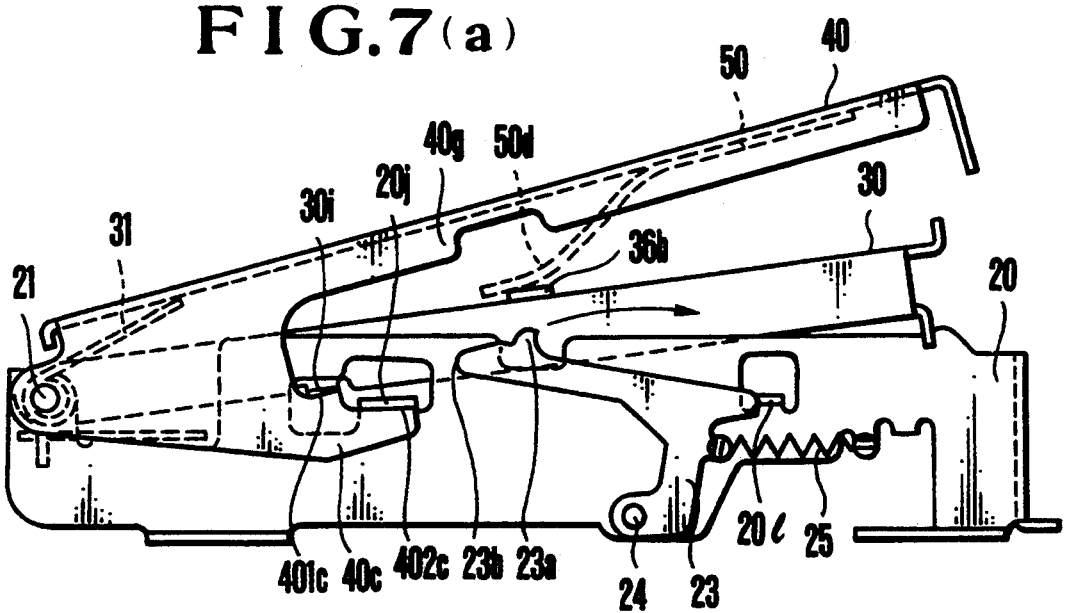
Figure 7B:
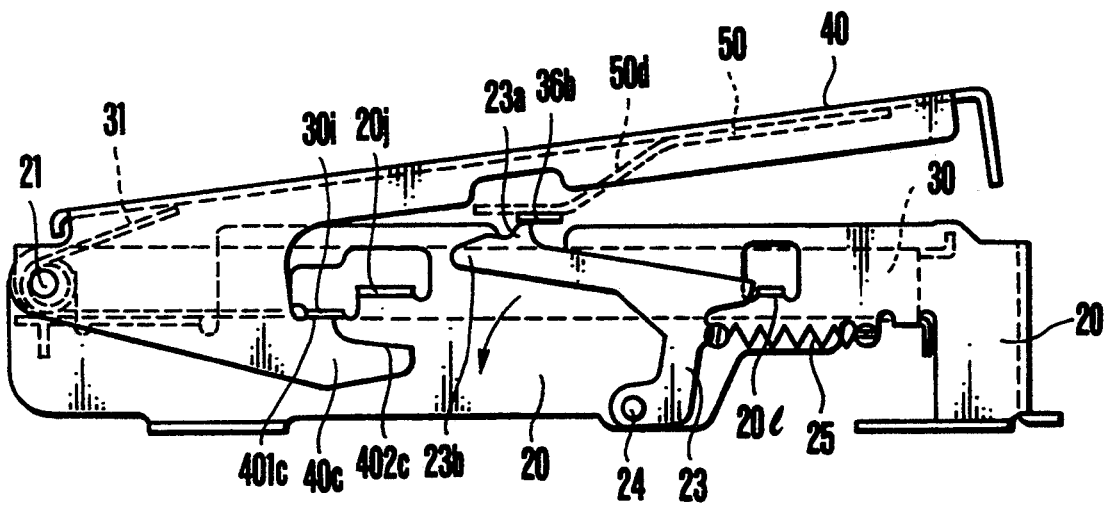
Figure 7C:
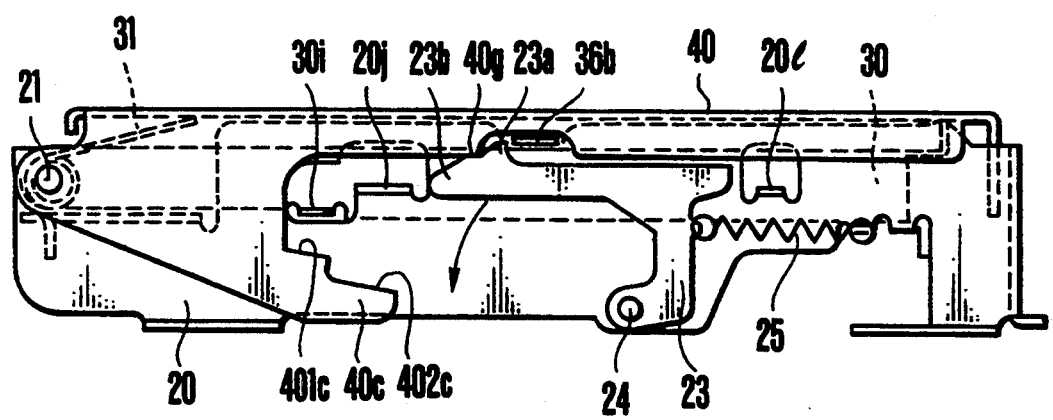

FIG. 2 is a top view showing a jacket loading mechanism unit as viewed from above. FIGS. 3(a) to 3(d) are side views showing the unit as in different operating states respectively. In an open position, the cover body 40 and the holder 30 are opened to permit the jacket 1 to be either loaded or removed. With the cover body 40 and the holder 30 in the open state as shown in FIG. 3(a), the holder 30 has been turned counterclockwise by the coil spring 31 which is disposed at the hinge part 22. The cover body 40 has been turned counterclockwise further than the holder 30 by the leaf spring 50a which is arranged on the reverse side thereof to push the upper surface of the holder 30 away from the cover body 40. In their open positions, as shown in FIG. 7(a), a clearance between the cover body 40 and the holder 30, i.e., the turning angle between them, is restricted by the engagement of the upper engaging part 401c of the engaging arm 40c of the cover body 40 with the projection 30i of the holder 30. The turning angle of the cover body 40 relative to the chassis 10 is restricted jointly by the lower engaging part 402c of the engaging arm 40c and the projection 20j of the frame 20. The open positions of the cover body 40 and the holder 30 are determined by the interactions of these parts.

Meanwhile, the jacket ejecting member 32 which is disposed within the holder 30 has one end thereof secured to the rear inner edge of the holder 30 and the other end formed into a jacket pushing part 32a. The jacket pushing part 32a is arranged to abut on the rear side face of the jacket 1 when it is inserted in the holder 30. Further, the upper side face of the other end is formed into an engaging part 32b which is arranged to engage the engaging hole 30k provided in a rear part on the upper side of the holder 30. Further, the jacket ejecting member 32 is mounted in a state of being constantly urged upward to exert pressure on the reverse side of the upper plate of the holder 30. Therefore, in inserting and ejecting the jacket 1, the engaging part 32b slides and moves in the state of being pressed against the reverse side of the upper plate of the holder 30.

When the jacket 1 is inserted in the jacket inserting Opening of the holder 30 under this condition, the jacket ejecting member 32 is pushed back against the resilience thereof and turns in the direction of arrow A as shown in FIG. 2. Than, the above-stated upward pressure causes the engaging part 32b of the member 32 to come into the engaging hole 30k when the engaging part 32b reaches a position confronting the engaging hole 30k. The jacket ejecting member 32 is thus locked by this in its pressed position. This allows the jacket 1 to be stowed within the holder 30 without being ejected. This condition is as shown in FIG. 3(b).

When the jacket 1 is thus inserted in the holder 30, the front edge of the shutter 4 abuts on the shutter opening member 33 disposed on the inner side face of the holder 30. The shutter 4 is thus opened by the jacket inserting action. Further, before this action, a shutter unlocking projection (not shown) which is disposed on the inner side face of the holder 30 engages the shutter lock lever 5 to unlock the shutter 4.

When the cover body 40 is closed after completion of the jacket inserting action, the holder 30 is also closed through the leaf spring 50a against the force of the coil spring 31 as shown in FIG. 3(c). Then, the holder 30 is turned until the lower side thereof comes to abut on the projection 20k. The jacket 1 which is within the holder 30 is positioned both in the vertical and horizontal directions by means of the positioning posts 14a to 14c provided on the chassis 10. The shutter is opened and the magnetic head 13 comes into contact with the disc 2 through the aperture 1b of the jacket 1.

Figure 3D:
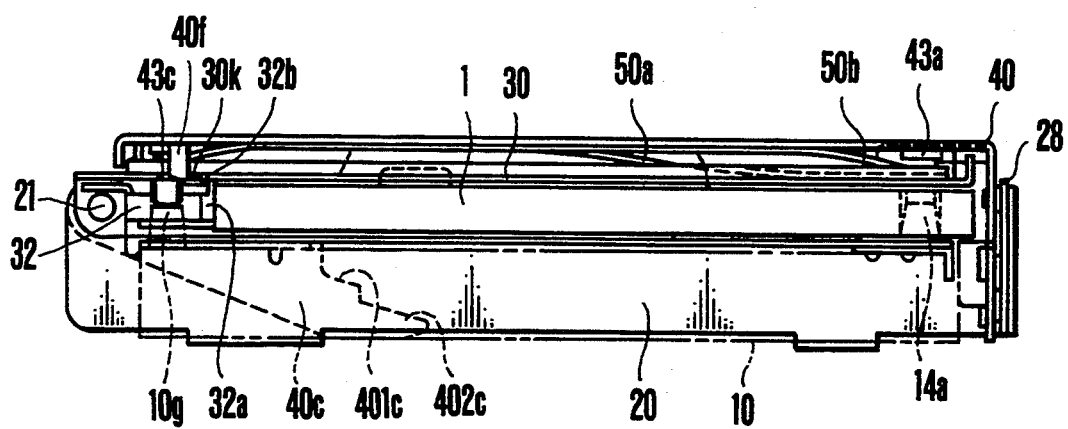
Figure 4:
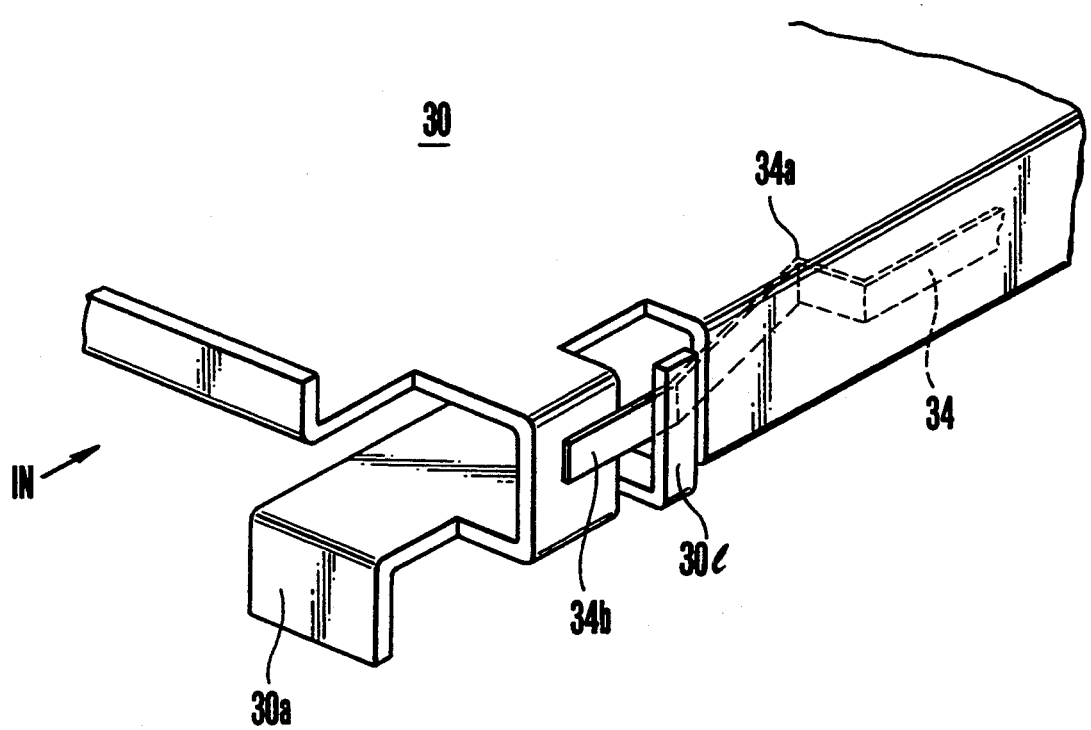
FIG. 4 is an oblique view showing a shutter closing mechanism.

With the cover body 40 closed against the force of the leaf spring 50a, the lock mechanism which will be described later locks the cover body 40 to its closed position. The projection 40f which protrudes from the lower side of the cover body 40 is inserted into the hole 30k of the holder 30 to disengage the engaging part 32b of the jacket ejecting member 32 which has been locked. This brings the jacket ejecting member 32 into a state of pushing the pushing part 32a against the rear face of the jacket 1 by its resilience. The pushing action serves to prevent the positioning posts 14a and 14b from rattling within the positioning holes 1c and 1d of the jacket 1. This condition is as shown in FIG. 3(d).

Under this condition, the stabilizing plate 41 which is mounted on the side of the cover body 40 is inserted in the aperture part 1a of the jacket 1 through the aperture part 30e of the holder 30. The stabilizing plate 41 then serves to stabilize the so-called "head touch" or contact of the magnetic head with the disc 2.

The PG coil 35 which is arranged to detect the rotation phase of the disc 2 is positioned on the holder 30 in a position confronting the center core 3 of the disc 2. Further, when the center core 3 of the disc 2 is mounted on the spindle 12 during the process of closing the holder 30, the disc pushing member 36 which is disposed on the holder 30 causes the center core 3 to be forcedly fitted onto the spindle 12.

These actions will be further described one by one later on. Next, when the cover body 40 is unlocked and is opened together with the holder 30, the resilient member 32 which is employed as the jacket ejecting member is moved by its own resilience in the direction reverse to the direction of arrow A until it comes back to its position shown in FIGS. 2 and 3(a). This returning motion ejects the jacket 1 from its loaded position toward the outside of the holder, i.e., in the direction reverse to the direction of arrow IN, so that the jacket 1 can be readily taken out. Meanwhile, there is provided a shutter closing mechanism which automatically closes the opened shutter 4 in response to the action of ejecting the jacket 1 from the holder 30.

As shown in FIGS. 1 and 2 and as mentioned above, a shutter closing member 34 which is made of a leaf spring is disposed on the left inner side of the holder 30. One end of the shutter closing member 34 which forms the left inner side of the holder 30 is secured by caulking or the like to the left inner side face of the holder 30. The other end of the shutter closing member 34 is located on the jacket inserting opening side and is bent to form a protruding part 34a which is arranged to engage the engaging part 4a of the shutter 4. The protruding part 34a has a slanting face on the jacket inserting side. When the jacket 1 is inserted, the slanting face allows the front edge of the shutter 4 to readily ride on the protruding part 34a thus introducing the protruding part 34a into the engaging hole 4a. As a result, the shutter 4 is locked by the shutter closing member 34 when the jacket 1 is placed within the holder 30. This enables the shutter 4 to be closed by the action of ejecting the jacket 1 from within of the holder 30. Further, as apparent from FIG. 4 which is an enlarged view, the free end of the shutter closing member 34 extends toward the outside of the side face of the holder 30 and is inserted without being fixed in between the side face and a projection 30l formed by cutting and raising a part of the side face of the holder 30. This arrangement prevents the free end 34b of the shutter closing member 34 from interfering with other members when the shutter closing member 34 is pushed toward the outside of the holder 30 with the jacket 1 inserted. Further, compared with an arrangement of leaving one end in a free state, the invented arrangement of restricting both ends of the leaf spring gives a stronger resilient engaging force. Besides, since the free end 34b is not fixed, a further advantage of the arrangement lies in the excellent durability of the shutter closing member, i.e., the leaf spring, ensured in that the leaf spring can escape from any stress possibly applied when it is warped.

(ii) The lock mechanism of the cover body 40 (holder 30) and jacket loading completion detecting means:

Referring to FIGS. 5(a) to 5(d), a lock mechanism for locking the cover body 40 and the holder 30 to their closed positions and a detecting mechanism for detecting that the jacket 1 is correctly loaded on the jacket loading part and the holder 30 and the cover body 40 have been completely locked are arranged as follows:

FIGS. 5(a) to 5(d) show the details of the reverse side of the front plate 20a of the frame 20. On the reverse side of the front plate 20a of the frame 20, there is provided a lock lever 28 for locking the cover body 40 to its closed position. The lock lever 28 is arranged to be slidable right and left jointly by its slots 28a and 28b and guide pins 201a and 202a provided on the front side plate 20a. One end of the lock lever 28 protrudes from the outside of one side of the frame 20 as an operation part 28c which permits an operation on the lock lever 28.

A protruding piece 28d which extends from the upper edge of the lock lever 28 is provided with a lock pin 28e. The pin 28e is arranged to lock the cover body 40 by engaging its lock claw 40e when the cover body 40 is closed. A lock stop lever 27 which is provided for keeping the lock lever 28 in its unlocking position has one end thereof rotatably mounted on the above-stated guide pin 202a. The stop lever 27 is connected to the lock lever 28 by means of a spring 29a. The other end of the lock stop lever 27 is formed to be a protruding piece 27a which is arranged to be pushed down by engaging the lower edge of the cover body 40 when the latter is closed. The stop lever 27 further has, at a part on its upper side, an engaging stepped part 27b formed in a state of being bent toward one side of the lock lever 28. This stepped part 27b is arranged to keep the lock lever 28 in its left position (unlocking position) as viewed on these drawings FIGS. 5(a) to 5(d).

Further, at the left end part of the front plate 20a, as viewed on these drawings, there is provided a leaf switch SW which is arranged to detect completion of a locking action on the cover body 40 with the jacket 1 loaded in the given jacket loading position. The guide pin 201a is rotatably attached a switch control lever 26. The switch control lever 26 is constantly urged to turn counterclockwise by a spring 29b and is arranged to operate the leaf switch SW according to the presence or absence of the jacket 1 within the holder 30 and according to the movement of the lock lever 28. The control lever 26 has an engaging part 26a formed at one end thereof to be pushed by the lower side of the jacket 1 disposed within the holder 30. At the other end of the control lever 26, there is formed an operation part 26b which is arranged to operate the leaf switch SW. In the intermediate part of the control lever 26, there are provided a projection 26d and a notch 26c which is arranged to engage an engaging piece 28g which is formed on one side of the lock lever 28 in a bent state.

Figure 5A:
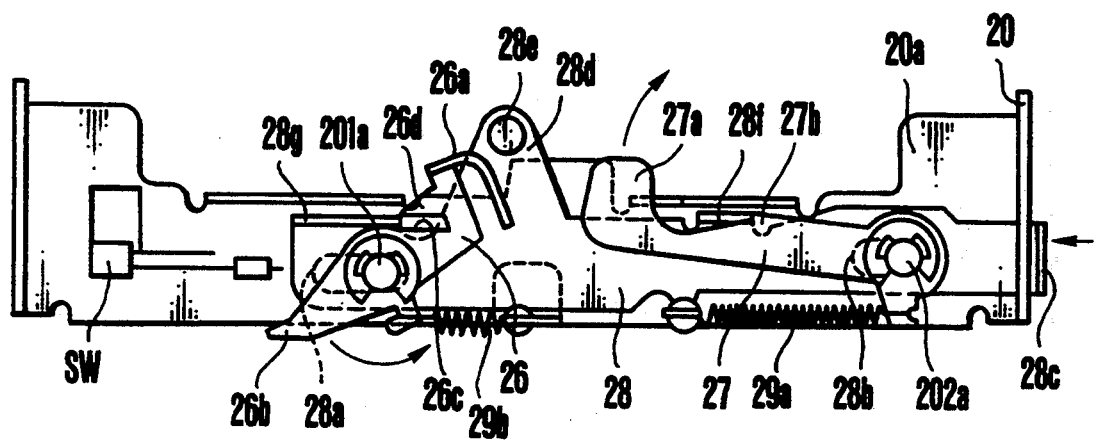
FIGS. 5(a) to 5(d) are side views showing the arrangement and operations of the lock mechanism provided for the holder and the cover body.

FIG. 5(a) shows an open or ejecting condition obtained by pushing the operation part 28c of the lock lever 28 to the left to disengage the lock pin 28e from the lock claw 40e of the cover body 40. In the case of FIG. 5(a), both the cover body 40 and the holder 30 are in their open states.

With the lock lever 28 moved to the left, the lock stop lever 27 is turned clockwise through the spring 29a. As a result, the protruding piece of the lock stop lever 27 is brought to a position to be capable of engaging the lower face of the jacket 1. The lock lever 28 is in a left position thereof, i.e., in an unlocking position, where its engaging piece 28f is engaging the engaging stepped part 27b of the lock stop lever 27. Meanwhile, the switch control lever 26 is turned counterclockwise by the force of the spring 29b to have the operation part 26b moved away from the leaf switch SW and its engaging part 26a in a protruding state to be capable of engaging the lower face of the jacket 1.

Figure 5B:
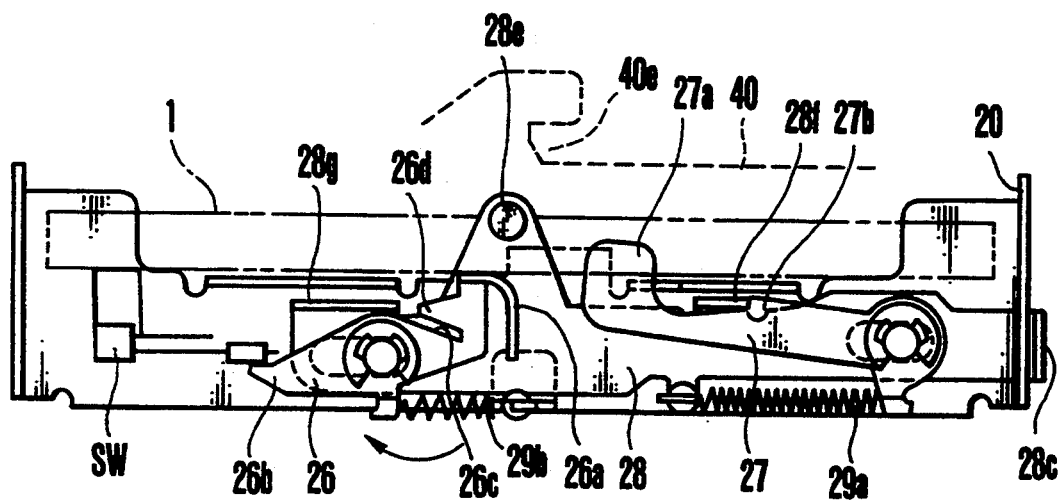

When the cover body 40 is closed by moving it toward the apparatus body under this condition, the holder 30 is moved to the predetermined loading position as shown in FIG. 5(b). In this instance, if the jacket 1 is present within the holder 30, the switch control lever 26 has its engaging part 26a pushed down by the lower side of the jacket 1. This causes the control lever 26 to turn clockwise against the force of the spring 29b. The operation part 26b of the lever 26 then comes to a predetermined position near to the leaf switch SW. Following this, when the cover body 40 is further closed to its lock position, the lock claw 40e of the cover body 40 takes a position confronting the lock pin 28e of the lock lever 28. The lock stop level 27 then has its engaging part 27a pushed by the lower front edge of the cover body 40. This causes the lock stop lever 27 to turn counterclockwise against the force of the spring 29a. As a result, the engaging stepped part 27b releases the lock lever 28 from its locking state. The lock lever 28 is caused to slide to the right by the resilience of the spring 29a. The lock pin 28e then comes to engage the lock claw 40e to have the cover body 40 and the holder 30 in their closed positions.

Figure 5C:
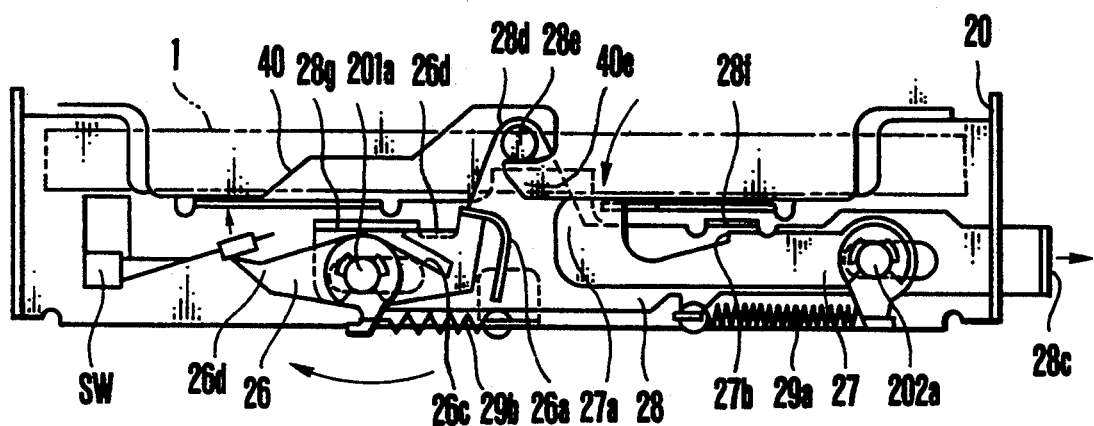

The slide of the lock lever 28 causes its engaging piece 28g to ride on the upper face of the projection 26d of the switch control lever 26 to turn the control lever 26 clockwise. The leaf switch SW is closed by this clockwise turning motion of the lever 26 to detect completion of the locking action on the cover body 40 after loading of the jacket 1. Then, a control circuit which is not shown performs a recording or reproducing operation. This condition is as shown in FIG. 5(c).

Figure 5D:
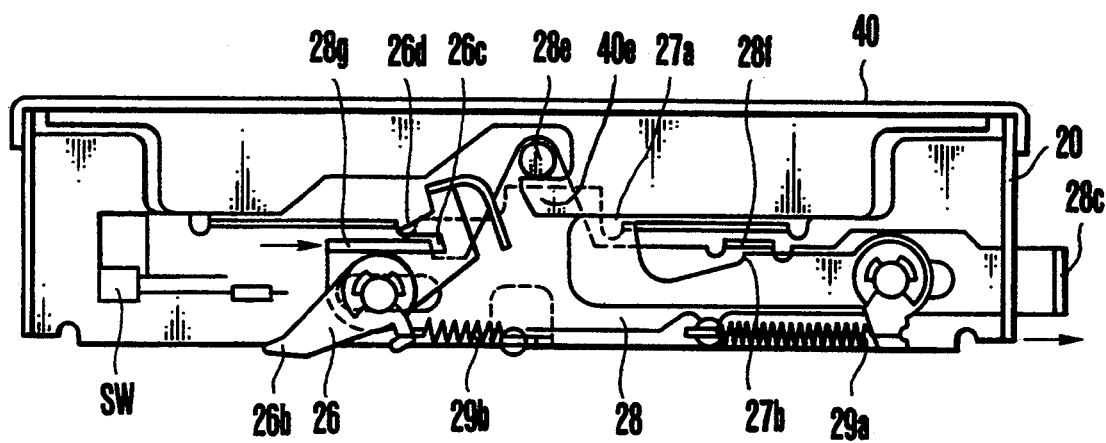

If the jacket 1 is not within the holder 30 when the holder 30 and the cover body 40 are closed, the switch control lever 26 does not turn when the holder 30 is closed to its position of FIG. 5(b) because of the absence of the jacket 1. In this case, therefore, the operation part 26b remains in its position of being separated from the leaf switch SW. Under that condition, the engaging piece 28g of the lock lever 28 is opposed to the notch 26c of the switch control lever 26. Therefore, when the cover body 40 is locked by the rightward slide of the lock lever 28 with the cover body 40 closed to the extent of its lock position, the engaging piece 28g enters the notch 26c and the switch control lever 26 does not turn. Therefore, the leaf switch SW is not closed. Then, upon completion of the locking action on the cover body 40, the absence of the jacket 1 from the holder 30 is detected by the open state of the switch SW. This condition is as shown in FIG. 5(d). Further, since the switch control lever 26 is locked by the lock lever 28 in this case, the lever 26 never is rattled by vibrations and the switch SW never is faultily operated.

In opening the cover body 40 and the holder 30, the operation part 28c of the lock lever 28 is pushed to slide it to its unlocking position on the right-hand side. With the cover body 40 unlocked, the cover body 40 and the holder 30 are opened. The lock stop lever 27 turns clockwise along with the opening movement of the cover body 40. The engaging stepped part 27b of the lever 27 engages the engaging piece 28f of the lock lever 28. This brings the lock lever 28 back to its position as shown in FIG. 5(a) by keeping it in the unlocking position.

The lock lever 28 is thus arranged to be kept in the unlocking position until the cover body 40 is closed. Therefore, the lock lever 28 imposes no load when the cover body 40 is closed, so that the closing action can be smoothly carried out.

(iii) The disc pushing mechanism:

In mounting on the spindle 12 the disc 2 disposed within the jacket 1 which is placed within the holder 30 with the holder 30 closed on the chassis 10 of the apparatus body, the disc pushing mechanism pushes the center core 3 of the disc 2 to fit it by force onto the spindle 12 as mentioned in the foregoing.

With the apparatus arranged to have the hole of the center core 3 fitted on the spindle as in the case of this embodiment, a pushing force of about one hundred and several ten grams is required for fitting the center core 3 on the spindle 12 without fail. If the disc 2 is to be loaded just by the closing force of the holder 30 alone, the disc 2 might be imperfectly loaded due to a discrepancy in position between the center core 3 and the spindle 12 or variations in the manufactured dimensions of the center core 3 or the like. The disc pushing mechanism is provided for the purpose of solving this problem.

Referring also to FIG. 1, a shaft 37 is interposed in between the support pieces 30g and 30h disposed on two sides of the upper aperture part 30f of the holder 30. The disc pushing lever 36 is rotatably carried on about the middle part thereof by this shaft 37. A leaf spring 50d which is attached to the reverse side of the cover body 40 is arranged to urge the lever 36 to turn counterclockwise. In other words, the disc pushing part 36a of the lever 36 located above the center core 3 is urged by the spring 50d to move away from the spindle 12. The leaf spring 50d does not have to be strong as it is required only to separate the disc pushing part 36a from the center core 3 of the disc 2.

As apparent from FIG. 2, the disc pushing part 36a consists of left and right arms 361a and 362a each of which has a pushing projection formed at its tip. The two arms are arranged to push the upper surface of the center core 3 at its two side points avoiding the upper end of the spindle 12 and the PG coil (phase detecting member) 35. On one end of the disc pushing lever 36 which is on the side opposite to the spindle 12, an engaging piece 36b is formed and arranged to engage a control lever 23 which is rotatably attached by a shaft 24 to the left side face of the frame 20. The control lever 23 is urged to turn clockwise by a spring 25 with a stronger force than that of the leaf spring 50d which urges the disc pushing lever 36. The turning position of the control lever 23 is restricted by a projection 20l provided on one side of the frame 20.

Figure 6A:
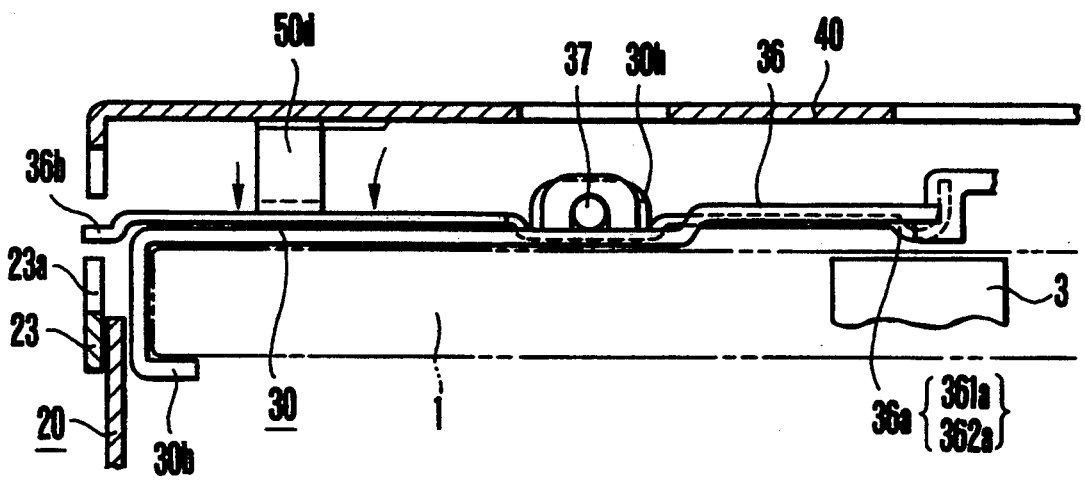
FIGS. 6(a) to 6(c) and 7(a) to 7(d) are front and side views showing the arrangement and operations of a disc pushing mechanism.
Figure 6B:
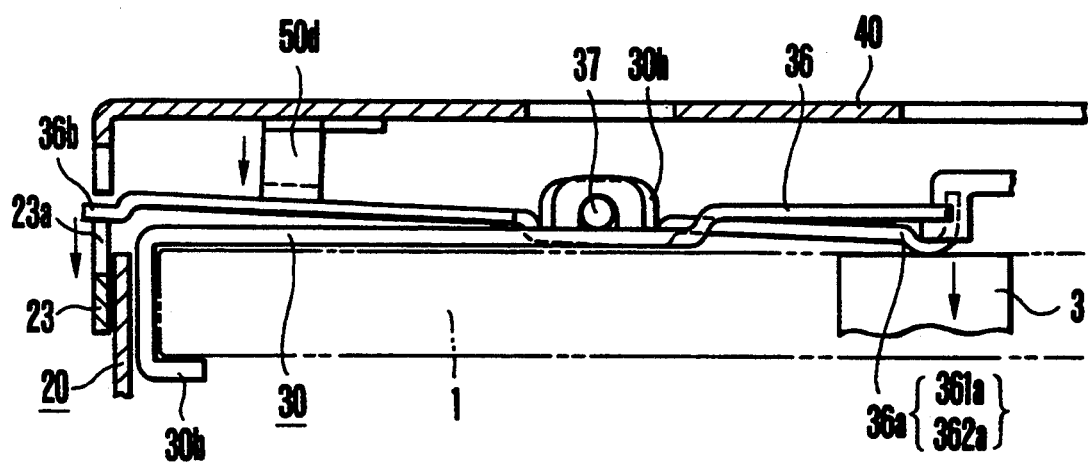

FIGS. 6(a) and 7(a) show an open condition. When the jacket 1 is inserted into the holder 30 under this condition and the cover body 40 is closed, the cover body 40 and the holder 30 begin to move to the jacket loading position while being kept at a given distance away from each other by the leaf spring 50d. In the open condition, the disc pushing lever 36 has its disc pushing part 36a (including the arms 361a and 362a) in a state of having been turned away from the center core 3 of the disc 2 by means of the leaf spring 50d. Therefore, the disc pushing part 36a never hinders the jacket 1 from being smoothly inserted into the holder 30.

Immediately before arrival of the holder 30 at its closed position, the engaging piece 36b of the disc pushing lever 36 comes to abut on the projection 23a formed at the fore end of the control lever 23. Then, a further movement of the holder 30 in the closing direction causes the engaging piece 36b of the disc pushing lever 36 to be pushed upward by the control lever 23. This causes the lever 36 to turn clockwise to have its disc pushing part 36a push the center core 3 of the disc 2 to the spindle. The center core 3 is thus forcedly fitted on the spindle 12. In order that the pushing action is performed as described, the force of the spring 25 which urges the control lever 23 must be stronger than that of the spring 50d which parts the disc pushing lever 36 from the disc 2.

When the holder 30 moves down further toward the closed position, the disc pushing lever 36 does not turn any further after the center core 3 is fitted on the spindle 12. The engaging piece 36b of the disc pushing lever 36 pushes the control lever 23 down against the force of the spring 25 and then the lever 36 turns counterclockwise. A superfluous portion of the center core pushing stroke of the disc pushing lever 36 after completion of the the center core fitting action on the spindle 12 can be absorbed by the counterclockwise turning movement. This effectively prevents the center core 3 and the disc pushing mechanism from being damaged.

Figure 6C:
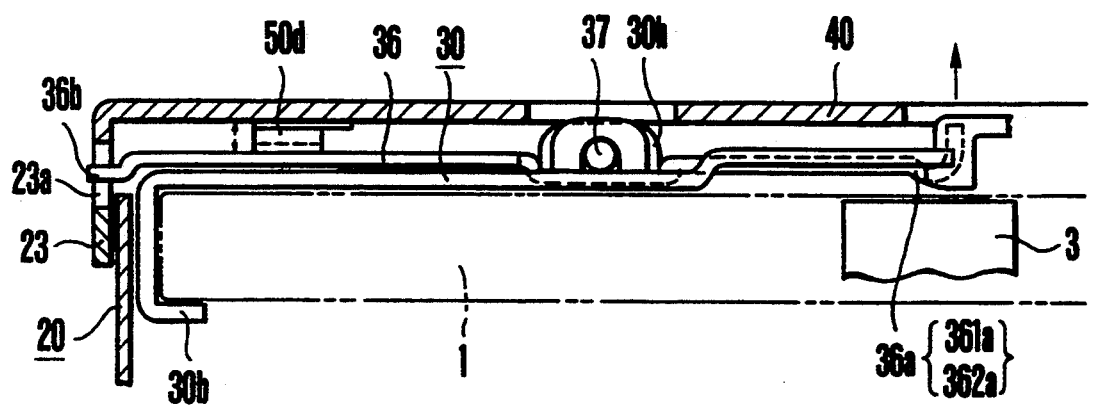

With the holder 30 moved to the predetermined loading position and the cover body 40 closed against the force of the leaf spring 50a interposed in between the cover body 40 and the holder 30, when the cover body 40 reaches the closed position to be locked there as mentioned above, the engaging part 40g disposed at the lower edge of the cover body 40 pushes the fore end engaging part 23b of the control lever 23 to cause the control lever 23 to turn further counterclockwise. This causes the projection 23a of the control lever 23 to part from the engaging piece 36b of the disc pushing lever 36. The disc pushing lever 36 is then freed from the state of being pushed by the control lever 23 and is allowed to be turned counterclockwise by the leaf spring 50d back to its original position. Then, the disc pushing part 36a parts from the center core as shown in FIG. 6(c). After the center core 3 is fitted on the spindle 12, therefore, the pushing load is canceled, so that the rotation of the disc 2 can be smoothly controlled free from any unnecessary rotation load.

Figure 7D:
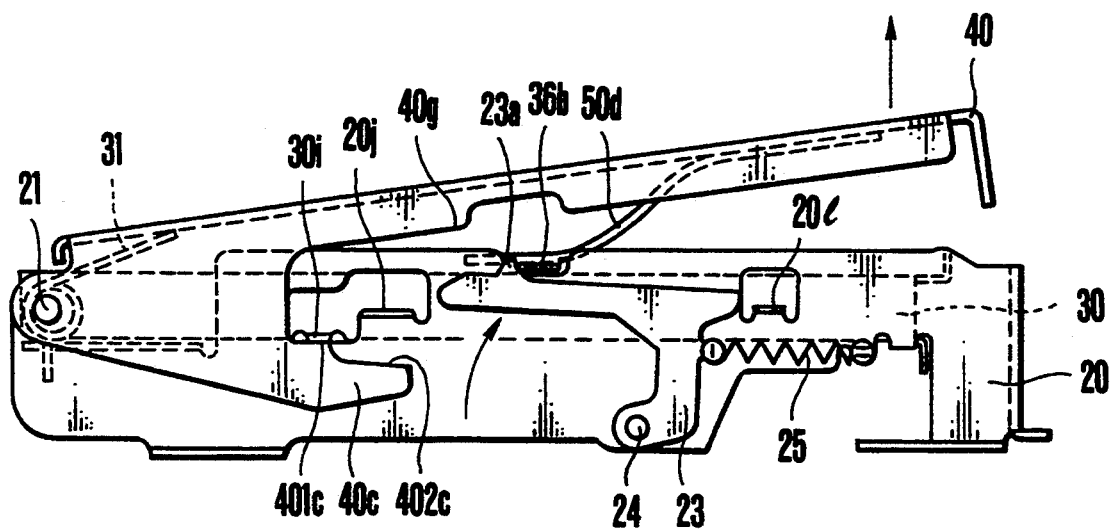

In a case where the cover body 40 is unlocked by pushing the operation part 28c of the lock lever 28 to open the cover body 40 and the holder 30, the embodiment operates as follows:

The cover body 40 and the holder 30 are opened by the coil spring 31 disposed at the hinge part 22. Therefore, as shown in FIG. 7(d), the control lever 23 is turned clockwise by the spring 25. The right side face of the projection 23a of the control lever 23 comes to abut on the engaging piece 36b of the disc pushing lever 36. The lever 23 thus lightly carries the disc pushing lever 36 in that state. Therefore, the disc pushing lever 36 is kept in its released or non-pushing position together with the urging spring 50d also when the cover body 40 and the holder 30 are opened. The disc pushing lever 36 thus can be reliably kept in place without rattling or without being moved toward the center core 3 by vibrations or the like.

The center core 3 of the disc 2 is parted from the spindle 12 with the holder 30 further opened. Then, the disc pushing lever 36 is also separated parted completely from the control lever 23 and is brought back to its position as shown in FIGS. 6(a) and 7(a).

As described above, the disc pushing mechanism of this embodiment is arranged to temporarily push the center core 3 only in mounting the disc 2 on the spindle 12 and to remain away from the holder 30 under all other conditions. The disc pushing mechanism, therefore, never causes any sudden change of the load on the spindle 12 both in loading and ejecting the disc 2. This gives excellent reliability and operability. In accordance with the arrangement of the invented disc pushing mechanism as described above, the disc pushing lever is constantly urged in the direction of canceling the center core pushing action. The center core is pushed by an external force only when the disc is to be loaded. Therefore, the disc pushing lever releasing spring is required to have only a weak spring force, which never causes any deformation nor rattling of other members. In other words, a mechanism of the type being constantly urged in the direction of pushing the disc not only requires a large pushing force and also requires a large force in canceling the pushing force. The mechanism of that type thus requires a large canceling position retaining force even after completion of the jacket loading action. Then, such a large force tends to deteriorate the precision of the mechanism after loading. Whereas, in accordance with the invented arrangement described, the control lever 23 which imparts a pushing force to the disc pushing lever 36 is required to act only in closing the cover body and never acts on the disc pushing member and other members on the holder under both the open and closed conditions. The invented arrangement is thus free from this problem.

(iv) Stabilizing plate 41:

As mentioned in the foregoing, the stabilizing plate 41 is mounted on the reverse side of the cover body 40 through the support plate 42. The plate 41 is in a position to be opposed to the magnetic head 13 across the disc 2 through the aperture part 1a of the jacket 1 when the holder 30 and the cover body 40 are closed. The plate 41 is provided for the purpose of stabilizing a contact state between the disc 2 and the head called "head touch." The details of arrangement for carrying the stabilizing plate 41 are as described below with reference to FIGS. 3(a) to 3(d), 8, 9 and 10.

Figure 8:
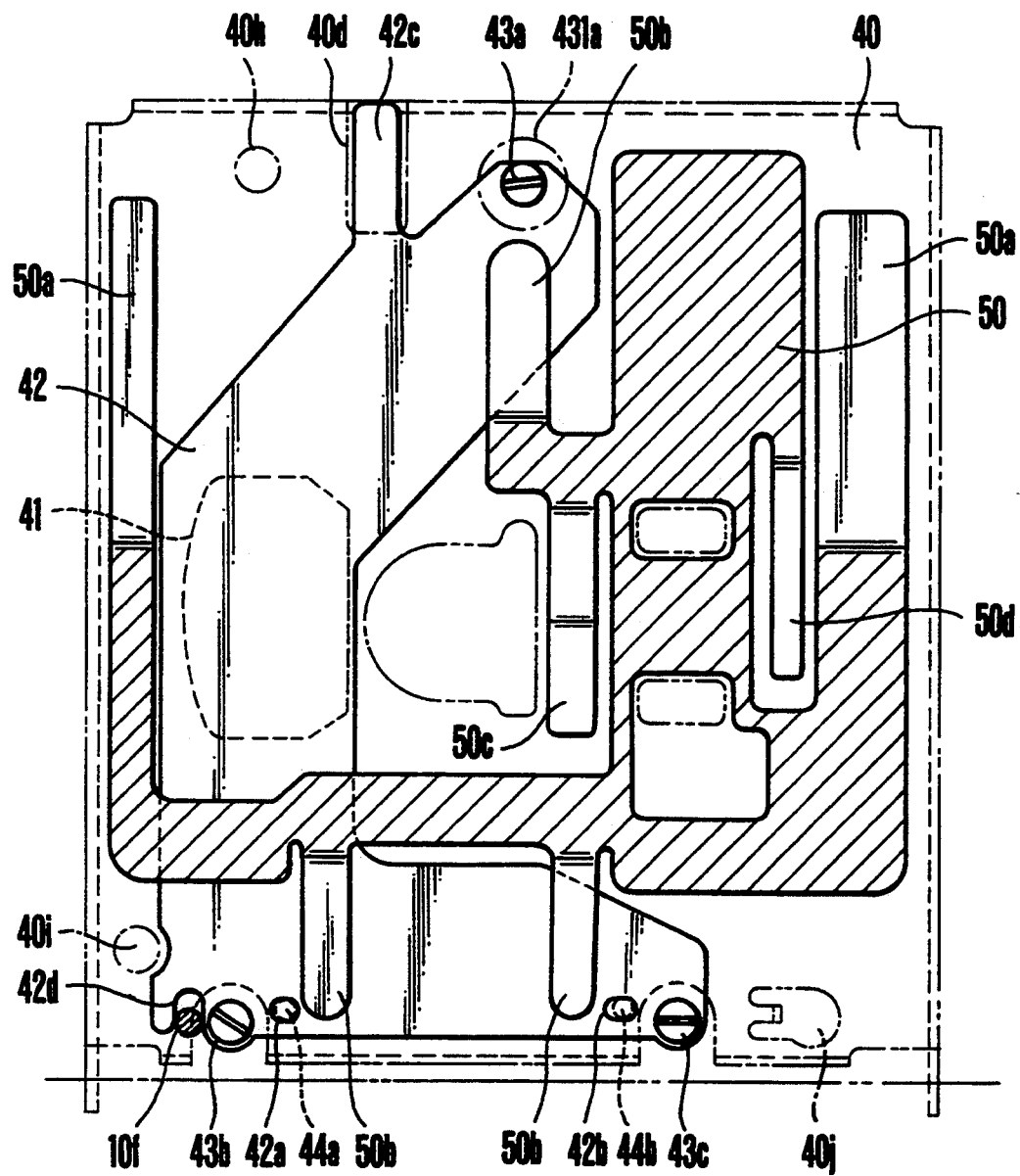
FIGS. 8, 9 and 10 show the arrangement of a stabilizing plate support mechanism and a leaf spring.

FIG. 8 shows the arrangement of the cover body 40. The cover body 40 is indicated with a two-dot-chain line for illustration of the inside mechanism. The stabilizing plate 41 is mounted in a hung state on the reverse side of the cover body 40 through the support plate 42. As apparent with reference also to FIGS. 3(a) to 3(d), the stabilizing plate 41 is provided with a groove 41a which is formed in a position confronting the magnetic head 13 according to the moving route of the head 13. The vertical and horizontal positions of the support plate 42 are arranged to be somewhat adjustable. For this purpose, slots 42a and 42b formed in the rear part of the plate 42 on the side of the hinge are fitted on the pins 44a and 44b erected on the cover body 40 while an engaging projection 42c which is disposed in the front part on the jacket inserting side engages the hole 40d which is provided in the front side of the cover body 40. The leaf spring 50b is arranged to constantly urge the support plate 42 to move downward, i.e., toward the holder 30. Further, although it is not shown, some retaining means is provided at the tip of each of the pins 44a and 44b for preventing the support plate 42 from coming out of its position. For this purpose, either a stop member is attached there or the pin is provided with a large diameter part. Further, a notch 42d is formed in the rear edge of the support plate 42. When the support plate 42 is mounted on the chassis 10 of the apparatus body, the notch 42d comes to engage a pin 10f which is disposed on the chassis 10 and has a circular-cone shaped fore end.

Figure 9:
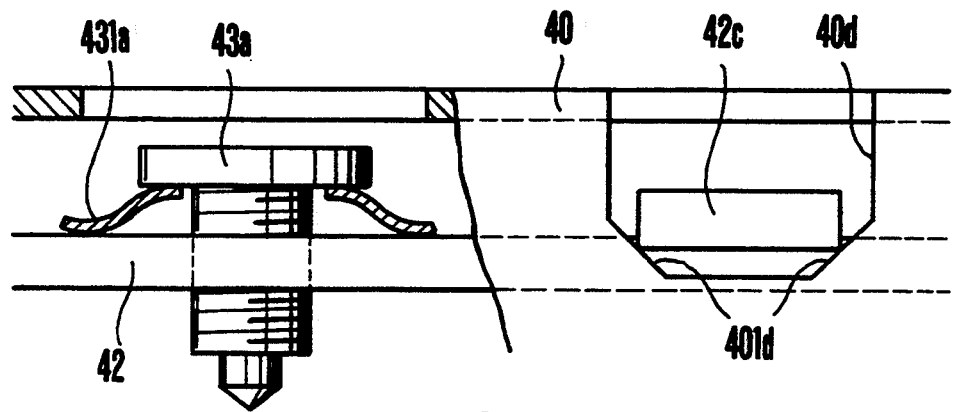
Figure 10:
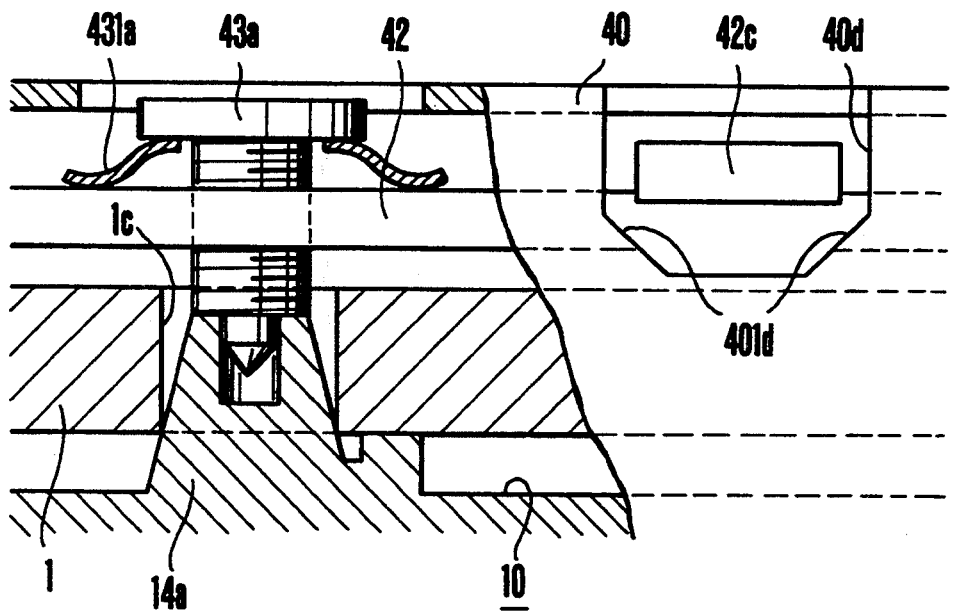

The part of the engaging hole 40d of the cover body 40 which is arranged to engage the engaging projection 42c of the support plate 42 is provided with slanting engaging parts 401d as shown in FIGS. 9 and 10. When the cover body 40 is open, the support plate 42 is pushed toward the holder by leaf spring 50b. Then, the engaging projection 42c is pressed against the engaging part 401d in such a way as to be positioned in the middle part within the engaging hole 40. The stabilizing plate mounting position thus can be restricted by this even while the stabilizing plate 41 is away from the disc 2 with the cover body 40 opened. Therefore, the stabilizing plate 41 can be accurately mounted without any deviation of its mounted position due to a positional deviation occurring prior to mounting or due to imperfect engagement of positioning means.

The position of the support plate 42 relative to the chassis 10 is determined by having the positioning posts 14a to 14c which are provided on the chassis 10 engage the positioning pins 43a to 43c which are screwed into the support plate 42 at three points as shown in FIGS. 8, 9 and 10. In addition to that, the notch 42d is caused to engage the pin 10f. The positioning pins 43a to 43c are screwed with their fore ends protruding downward from the support plate 42 through waved washers 431a to 431c. The position of the support plate, i.e., that of the stabilizing plate 41 can be adjusted by adjusting the extents to which these positioning pins are screwed in.

Further, the fore end of the pin 43a is formed into a circular cone shape.

Therefore, when the holder 30 and the cover body 40 are closed, the operating position of the support plate 42 is determined with the leaf spring 50b pressing the positioning pins 43b and 43c to engage the projections 10g and 10h on the chassis 10, pressing the notch 42d to engage the projection 10f and pressing the positioning pin 43a to engage the positioning post 14a which is fitted into the positioning hole 1c of the jacket 1. This arrangement thus enables the stabilizing plate 41 to be positioned relative to the chassis 10 and also to be positioned relative to the jacket 1 by means of the same positioning members. In addition to that, the position of the stabilizing plate 41 which must be set with a high degree of precision relative to the jacket 1 can be accurately controlled. Further, in that instance, the mounting position of the support plate 42 is arranged such that the support plate 42 comes to be in a state of being buoyed up toward the cover body 40 against the force of the leaf spring 50b. Therefore, the engaging projection 42c moves away from the slanting face 401d of the engaging hole 40d as shown in FIG. 10, so that the positioning on the chassis 10 can be accomplished without being hindered by positioning accomplished on the side of the cover body 40.

The support plate 42, i.e., the stabilizing plate 41, is thus arranged to be positioned by means of the positioning post 14a and the projections 10g and 10h for its vertical position and by the positioning post 14a and the pin 10f for its horizontal position.

(v) Rotation phase detecting member (PG coil) 35:

The rotation phase detecting member (PG coil) 35 which detects the rotation phase of the disc 2 is disposed in a position to be closely opposed to the center core 3 of the disc 2. The rotation phase of the disc 2 is detected by sensing a magnetic flux induced from the spindle magnet 12b disposed at the spindle 12 by the magnetic pin 3b disposed on the center core 3. As shown in FIG. 11, a detection coil 352 is wound around a yoke 353 which consists of a detection pin 353a and a flange part 353b. Further, a magnet 354 is provided on the opposite side of the flange part 353b for the purpose of intensifying the magnetism detected by the detection coil 352.

More specifically, the magnet 354 has its polarity set in such a way as to pull into the detection coil 352 the lines of magnetic force induced from the magnet 12b of the spindle 12 via the magnetic pin 3b. The polarity is appropriately set according to the polarity of the magnet 12b disposed on the side of the spindle 12. Unlike the conventional arrangement, the provision of this magnet 354 enables the rotation phase detecting member 35 to sufficiently detect even a very weak level of a PG detection signal without increasing the number of turns of the coil. The detecting member 35 is thus arranged to be capable of detecting the rotation phase of the disc 2 with a high degree of sensitivity without bringing about any deterioration of an S/N ratio or the like that tends to be caused by an increase in the size of the coil and the yoke and noises resulting from an increased number of turns of the coil.

The reduction in size of the PG (rotation phase) detecting member is very advantageous particularly for the various members disposed above the center core 3 including the disc pushing lever 36 which is provided for pushing the center core 3 in mounting the disc 2 on the spindle 12.

While the magnet 354 is separately arranged for the yoke 353 in the case of this embodiment, the above-stated advantage is attainable also by magnetizing the yoke to enable it to act as a magnet without the magnet 354.

Figure 12:
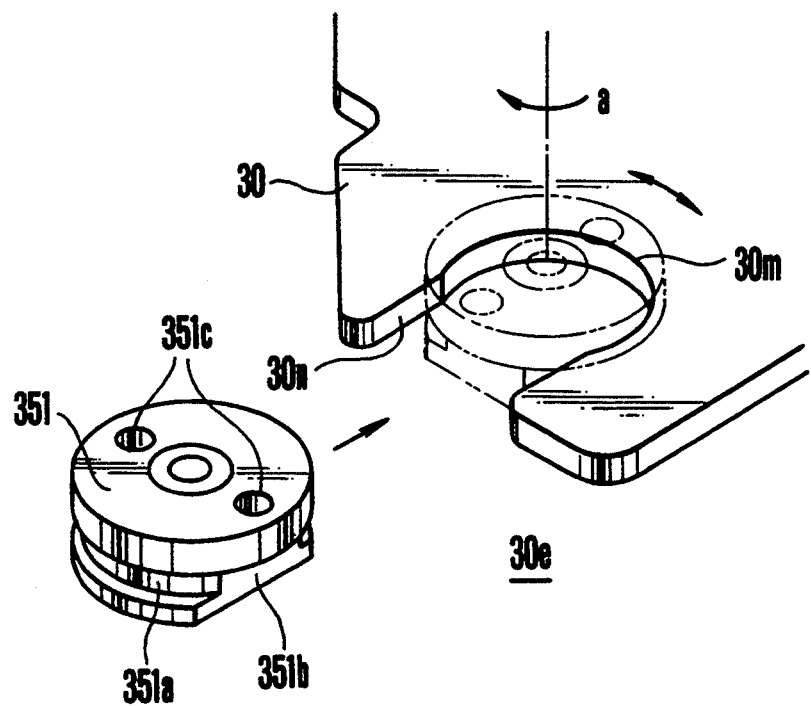

The yoke 353 on which the detection coil 352 is mounted is disposed through a PG holder 351 on the upper side of the holder 30 in a position to be opposed to the center core 3. The yoke 353 is mounted in the following manner: as apparent from the top view of FIG. 2 and the oblique view of FIG. 12, a PG detecting member mounting hole 30m is formed in the upper side of the holder 30. A notch 30n (or a cutout part) the width of which is shorter than the diameter of the hole 30m is formed in a part of the hole 30m and is arranged to be continuous from the aperture part 30e of the holder 30.

Meanwhile, the PG holder 351 is provided with an engaging groove 351a which is formed around the outer circumference of the PG holder 351. The diameter of the engaging groove 351a is equal to or slightly larger than the above-stated hole 30m. The width of the groove is about equal to the thickness of the upper plate of the holder 30. A small diameter part 351b is formed in a part of the PG holder 351 in such a way as to enable the PG holder 351 to pass the above-stated notch 30n. In mounting the rotation phase detecting member 35 on the holder 30, the small diameter part 351b is inserted into the mount hole 30m from the aperture part 30e via the notch 30n. Then, the PG holder 351 is turned about 90 degrees in the direction of arrow "a" to shift the small diameter part 351b to a position not confronting the notch 30n, so that the PG holder 351 can be retained within the mount hole 30m.

The PG holder 351 is thus arranged to be set in its optimum position by inserting it into the mount hole 30m and then by turning it about 90 degrees. However, the position of the PG coil 35 relative to the magnetic pin 3b on the center core 3 can be made adjustable by slightly turning the PG holder 351 right and left in its fitted state within the mount hole 30m with the mounted position of the PG yoke 353 set to be somewhat deviating from the turning center obtained in the engaging groove part. In the drawings, a reference numeral 351c denotes holes which are provided for engaging an adjustment jig to be used in turning the PG holder 351.

The PG mounting arrangement described above is characterized by the positioning means for determining the operating position of the rotation phase detecting member. Referring to FIG. 11, the operating position is determined in the following manner: with the center core 3 of the disc 2 loaded on the spindle 12 after closing of the holder 30, the lower face of the PG holder 351 abuts on the upper end of the non-rotating support shaft 12a of the spindle 12. The vertical position of the PG holder 351 can be determined by using the spindle shaft. Further, the upper end of the spindle 12 is arranged to be a fixed shaft which rotatably carries the spindle 12 through a bearing 12c and never hinders the rotation of the spindle 12 by engaging the PG holder 351.

The above-stated arrangement permits the position of the PG coil 35 to be determinable relative to the center core carrying spindle 12 without recourse to any additional positioning member for the PG holder 351 and without the fear of the adverse effect of any error that might be caused by the hinge part 22 of the holder 30, etc. Therefore, a desired degree of positioning accuracy can be attained without difficulty.

Further, the possibility of changes in distance between the PG yoke 353 and the magnetic pin 3b of the center core 3 resulting from buoying of the PG holder 351 from the upper end of the spindle 12 due to buoying of the holder 30, etc., is eliminated by means of a leaf spring 50c which is arranged to come to the inner side of the cover body 40 when the cover body 40 is closed. This leaf spring 50c pushes a part of the PG holder 351 toward the support shaft 12a of the spindle 12. The positions of the PG holder 351 and that of the spindle 12 relative to each other thus can be unvaryingly maintained without fail.

Further, in FIG. 11, a reference numeral 12d denotes a cap to be used for mounting and positioning the spindle 12 on and in relation to the support shaft 12a.

(vi) The urging springs arranged in the mechanisms:

As described in the foregoing, the embodiment is provided with leaf springs for four different functions, including: a leaf spring 50a interposed in between the cover body 40 and the holder 30; a leaf spring 50b urging toward the holder 30 the support plate 42 on which the stabilizing plate 41 is mounted; a leaf spring 50c urging the PG detecting member 35 toward the spindle 12; and a leaf spring 50d urging the disc pushing lever 36 in the direction of release. As shown in FIG. 8, these leaf springs are formed in one body on a leaf spring base plate 50 which is attached to the cover body 40. Therefore, they can be mounted in their operating positions and simultaneously positioned by just mounting the leaf spring base plate 50 to the cover body 40. The pressing forces of the leaf springs can be differently set by adjusting the positions of parts at which they are bent.

Further, to avoid convergence of the pressing forces of these springs to one part of the cover body 40 or the holder 30, the leaf springs are dispersively formed. Therefore, no unnecessary force will be applied from one mechanism to another, so that these mechanisms can be arranged in a stable state.

In the recording or reproducing apparatus arranged according to this invention as described in the foregoing, the stabilizing plate which is employed as means for stabilizing the contact state between the magnetic head and the magnetic disc used as a recording medium is arranged to be set in its operating position by using a positioning member which is provided for positioning the magnetic disc containing jacket. This permits not only simplification of the positioning arrangement required but also reduction in space. The greatest advantage of the embodiment resides in that the positioning means for positioning the magnetic disc is used also for positioning work on the apparatus body. The stabilizing plate, therefore, can be directly positioned relative to the magnetic disc. This arrangement minimizes a possible error in position between the disc and the stabilizing plate. The embodiment thus ensures an adequate head touching state of the disc. The invention thus gives a highly reliable recording or reproducing apparatus which is capable of stably operating.

What is claimed is:

1. A loading apparatus for a recording apparatus comprising:

a) loading means having a holder member for holding a recording medium and moving said holder member for loading said recording medium to a predetermined loading position;

b) a head for performing recording on said recording medium;

c) phase detecting means mounted at a position on said holder member opposite to said recording medium, said phase detecting means detecting phase of said recording medium by detecting an indicating portion of said recording medium; and d) adjusting means for adjusting said position of said phase detecting means relative to said indicating portion of said recording medium, said adjusting means holding said phase detecting means on said holder member and capable of moving said phase detecting means on said holder member by moving said adjusting means.

2. An apparatus according to claim 1, wherein said recording medium is a magnetic disc housed within a jacket.

3. An apparatus according to claim 2, further comprising:

a stabilizing member for stabilizing a contact state between said head and recording medium and arranged opposite to said recording medium.

4. An apparatus according to claim 3, further comprising:

a first positioning means for positioning said jacket at said predetermined loading position, said first positioning means having a plurality of positioning pins for positioning said recording medium at said loading position by engaging positioning holes formed on said jacket; and a second positioning means for engaging said first positioning means to support said stabilizing member through said positioning holes.

5. An apparatus according to claim 3, wherein said holder member moves between a removable position where said recording medium is removable and said loading position.

6. An apparatus according to claim 5, further comprising:

a cover member moving along with said holding member.

7. An apparatus according to claim 6, wherein said stabilizing member is arranged to move to a position close to said recording medium, depending upon a closing operation of said cover member.

8. An apparatus according to claim 1, wherein said phase detecting means is a coil arranged to magnetically detect said indicating portion.

9. An apparatus according to claim 8, wherein said phase detecting means includes a magnet for promoting sensitivity of detection of the coil.

10. A disc driving apparatus comprising:

a) holding member for holding a recording medium;

b) loading means for loading said recording medium to a predetermined loading position by moving said holder member;

c) driving means for driving said recording medium in said loading position;

d) a head for accessing said recording medium in said loading position;

e) phase detecting means mounted at a position on said holder member opposite to said recording medium, said phase detecting means detecting phase of said recording medium by detecting an indicating portion of said recording medium; and f) adjusting means for adjusting said position of said phase detecting means relative to said indicating portion of said recording medium, said adjusting means holding said phase detecting means on said holder member and capable of moving said phase detecting means on said holder member by moving said adjusting means.

11. A device according to claim 10, wherein said recording medium is a magnetic disc housed within a jacket.

12. An apparatus according to claim 11, further comprising:

a stabilizing member which is arranged opposite to said head across said recording medium and urge said recording medium toward said head.

13. A device according to claim 12, further comprising a first positioning means having a plurality of positioning pins for positioning said recording medium in said loading position by engaging positioning holes formed in said jacket.

14. A device according to claim 13, further comprising a second positioning means for positioning said stabilizing member at a predetermined operating position by engaging said first positioning holes formed in said jacket.

15. A device according to claim 12, further comprising a cover member which is interlocked with said holder member, wherein said stabilizing member is supported on a support member mounted on said cover member and said stabilizing member is moved to said operating position by a closing movement of said cover member.

16. An apparatus according to claim 10, wherein said phase detecting means is a coil arranged to magnetically detect said indicating portion.

17. An apparatus according to claim 16, wherein said phase detecting means includes a magnet for promoting sensitivity of detection of the coil.

* * * * *

UNITED STATES PATENT AND TRADEMARK OFFICE
CERTIFICATE OF CORRECTION

PATENT NO. : 5,361,181

DATED : November 1, 1994

INVENTOR(S) : Tetsuji Kurata

It is certified that error appears in the above-identified patent and that said Letters Patent is hereby corrected as shown below:

```
Col. 1, line 38.   Change "Filed" to -- filed --.

Col. 3, line 67.   Change "parts" to -- part --.

Col. 4, line 24.   Change "jacket L" to -- jacket 1 --.

Col. 4, line 46.   After "jacket 1" insert -- . --.

Col. 5, line 44.   Change "round" to -- around --.

Col. 5, line 46.   Change "201" to -- 20ℓ --.

Col. 6, line 1.    Change "(a)" to -- 3(a) --.

Col. 8, line 60.   Change "Opening" to -- opening --.

Col. 10, line 13.  Delete "of".

Col. 10, line 18.  Change "301" to -- 30ℓ --.

Col. 10, line 67.  Change "on" to -- in --.

Col. 11, line 6.   After "attached" insert -- to --.

Col. 13, line 19.  Change "201" to -- 20ℓ --.

Col. 14, line 33.  Delete "parted".

Col. 14, line 53.  Change "and" to -- but --.
```

UNITED STATES PATENT AND TRADEMARK OFFICE
CERTIFICATE OF CORRECTION

PATENT NO. : 5,361,181

DATED : November 1, 1994

INVENTOR(S) : Tetsuji Kurata

It is certified that error appears in the above-identified patent and that said Letters Patent is hereby corrected as shown below:

Col. 18, line 21. Change "including:" to -- including --.

Signed and Sealed this

Seventeenth Day of January, 1995

Attest:

BRUCE LEHMAN

*Attesting Officer*    *Commissioner of Patents and Trademarks*